US009509736B2

(12) United States Patent
Rhea

(10) Patent No.: US 9,509,736 B2
(45) Date of Patent: Nov. 29, 2016

(54) METHOD FOR OPTIMIZING WAN TRAFFIC

(71) Applicant: Cisco Technology, Inc., San Jose, CA (US)

(72) Inventor: Sean Christopher Rhea, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 535 days.

(21) Appl. No.: 13/743,195

(22) Filed: Jan. 16, 2013

(65) Prior Publication Data
US 2014/0201308 A1   Jul. 17, 2014

(51) Int. Cl.
G06F 13/00 (2006.01)
H04L 29/06 (2006.01)
H04L 12/64 (2006.01)

(52) U.S. Cl.
CPC ........... H04L 65/60 (2013.01); H04L 12/6418 (2013.01)

(58) Field of Classification Search
CPC ................. G06F 17/30902; H04L 29/08144; H04L 12/6418; H04L 29/06; H04L 29/08072; H04L 29/08549; H04L 65/60
USPC ......................................................... 709/213
See application file for complete search history.

(56) References Cited

U.S. PATENT DOCUMENTS

| 6,292,880 | B1 | 9/2001 | Mattis et al. |
| 7,487,138 | B2 | 2/2009 | Borthakur et al. |
| 7,733,910 | B2 | 6/2010 | Mace et al. |
| 7,747,584 | B1 | 6/2010 | Jernigan |
| 7,769,834 | B2 | 8/2010 | Ly et al. |
| 7,814,284 | B1 | 10/2010 | Glass et al. |
| 7,827,404 | B1 | 11/2010 | Freed et al. |
| 7,849,134 | B2 * | 12/2010 | McCanne et al. ............ 709/203 |
| 7,852,237 | B2 | 12/2010 | McCanne et al. |
| 7,856,437 | B2 | 12/2010 | Kirshenbaum |
| 7,929,534 | B2 | 4/2011 | Poletto et al. |
| 8,069,225 | B2 | 11/2011 | McCanne et al. |
| 8,090,866 | B1 | 1/2012 | Bashyam et al. |
| 8,121,996 | B2 | 2/2012 | Andreev et al. |
| 8,176,186 | B2 * | 5/2012 | McCanne et al. ............ 709/228 |
| 8,180,902 | B1 | 5/2012 | Day et al. |
| 8,266,114 | B2 * | 9/2012 | Mace et al. .................. 707/692 |
| 8,291,081 | B2 | 10/2012 | Ahmed |

(Continued)

OTHER PUBLICATIONS

Tanenbaum, Andrew S. et al., "File System Distribution on UNIX Systems—Then and Now," ACM SIGOPS Operation Systems Review, 40(1), Jan. 2006, pp. 100-104.

(Continued)

*Primary Examiner* — Robert B Harrell
(74) *Attorney, Agent, or Firm* — Polsinelli PC

(57) ABSTRACT

A local stream store of a local proxy caches one or more streams of data transmitted over the WAN to a remote proxy, where each stream is stored in a continuous manner and identified by a unique stream identifier (ID). In response to a flow of data received from a client, the local proxy examines the flow of data to determine whether at least a portion of the flow has been previously transmitted to the remote proxy via one of the streams currently stored in the local stream store. If the portion of the flow has been previously transmitted to the remote proxy, the local proxy transmits a first message to the remote proxy without sending actual content of the portion of the flow to indicate that the portion of the flow has been transmitted in one of the streams previously transmitted to the remote proxy.

27 Claims, 30 Drawing Sheets

(56) References Cited

U.S. PATENT DOCUMENTS

| | | | |
|---|---|---|---|
| 8,473,690 | B1* | 6/2013 | Condict .................. 711/141 |
| 8,627,015 | B2 | 1/2014 | Durocher et al. |
| 8,706,971 | B1 | 4/2014 | Nayak |
| 8,924,591 | B2 | 12/2014 | Li et al. |
| 2006/0248194 | A1* | 11/2006 | Ly et al. ................ 709/226 |
| 2008/0005141 | A1 | 1/2008 | Zheng et al. |
| 2008/0281908 | A1 | 11/2008 | McCanne et al. |
| 2009/0319473 | A1 | 12/2009 | Rao et al. |
| 2010/0042790 | A1 | 2/2010 | Mondal et al. |
| 2010/0174881 | A1 | 7/2010 | Anglin et al. |
| 2010/0312800 | A1* | 12/2010 | Lumb .................... 707/796 |
| 2011/0010498 | A1 | 1/2011 | Lay et al. |
| 2011/0082840 | A1 | 4/2011 | Jayaraman |
| 2011/0093409 | A1 | 4/2011 | Tamura et al. |
| 2011/0161291 | A1 | 6/2011 | Taleck et al. |
| 2011/0218972 | A1 | 9/2011 | Tofano |
| 2011/0258161 | A1* | 10/2011 | Constantinescu et al. ... 707/640 |
| 2011/0276776 | A1 | 11/2011 | Ylonen |
| 2012/0102009 | A1 | 4/2012 | Peterson et al. |
| 2012/0136842 | A1 | 5/2012 | Zhu et al. |
| 2012/0150824 | A1 | 6/2012 | Zhu et al. |
| 2012/0158672 | A1 | 6/2012 | Oltean et al. |
| 2012/0166401 | A1 | 6/2012 | Li et al. |
| 2012/0166448 | A1 | 6/2012 | Li et al. |
| 2012/0303595 | A1 | 11/2012 | Liu et al. |
| 2013/0036277 | A1 | 2/2013 | Szczepkowski et al. |
| 2013/0046733 | A1 | 2/2013 | Sakuraba |
| 2013/0073528 | A1 | 3/2013 | Aronovich et al. |
| 2013/0086009 | A1 | 4/2013 | Li et al. |
| 2013/0218848 | A1* | 8/2013 | Gunda et al. ............ 707/692 |
| 2013/0227236 | A1 | 8/2013 | Flynn et al. |
| 2013/0238570 | A1 | 9/2013 | Rao et al. |
| 2013/0262704 | A1* | 10/2013 | Jain ...................... 709/247 |
| 2013/0275696 | A1 | 10/2013 | Hayasaka et al. |
| 2013/0318051 | A1 | 11/2013 | Kumar et al. |
| 2013/0326156 | A1* | 12/2013 | Cui et al. ................ 711/144 |
| 2014/0156607 | A1 | 6/2014 | Lillibridge |
| 2014/0258245 | A1 | 9/2014 | Estes |

OTHER PUBLICATIONS

Rhea, Sean et al., "Fast, Inexpensive Content-Addressed Storage Foundation," Proceedings of the 2008 USENIX Annual Technical Conference (ATC'08), pp. 143-156.

Garcia, Jeremy "Transparent Proxying with Squid," Linux Magazine, Apr. 15, 2005, downloaded from http://www.linux-mag.com/id/1928/, Sep. 13, 2012, 4 pages.

Muthitacharoen, Athicha et al., "A Low-Bandwidth Network File System," Proceedings of the Eighteenth ACM Symposium on Operating System Principles (SOSP'01), Oct. 2001, pp. 174-187.

Manber, Udi "Finding Similar Files in a Large File System," Proceedings of the USENIX Winter 1994 Technical Conference (WTEC'94), 11 pages.

"Meraki Introduces Industry's First Cloud Managed Switches, Expands Cloud Managed Security Appliance Family With Datacenter-Class Models and WAN Optimization," PR Newswire, downloaded from http://www.prnewswire.com/news-releases/meraki-introduces-industrys-first -cloud-managed-switches-expands-cloud-managed-security-appliance-family-with-datacenter-class-models-and-wan-optimization-137561443.html, Aug. 30, 2012, 3 pages.

Rabin, Michael O. "Fingerprinting by Random Polynomials," Report TR-15-81, Center for Research in Computing Technology, Harvard University, 1981, 14 pages.

Tridgell, Andrew "Efficient Algorithms for Sorting and Synchronization," The Australian National University, thesis submitted for the degree of Doctor of Philosophy at, Feb. 1999, 115 pages.

Spring, Neil T. et al., "A Protocol-Independent Technique for Eliminating Redundant Network Traffic," Proceedings of the Conference on Applications, Technologies, Architectures, Protocols for Computer Communication (SIGCOMM'00), Aug. 2000, pp. 87-95.

Douceur, John R., "Reclaiming Space from Duplicate Files in a Serverless Distributed File System," Microsoft Research, Microsoft Corporation, Technical Report, MSR-TR-2002-30, Jul. 2002, 14 pages.

Rhea, Sean C., "Value-Based Web Cahing," Proceedings of the Twelfth International World Wide Web Conference (WWW'03), May 2003, pp. 619-628.

Quinlan, Sean et al., "Venti: a new approach to archival storage," Proceedigns of the 1$^{st}$ USENIX Conference on File and Storage Technologies (FAST'02), Jan. 2002, 13 pages.

Zhu, Benjamin et al., "Avoiding the Disk Bottleneck in the Data Domain Deduplication File System," Proceedings of the 6$^{th}$ USENIX Conference on File and Storage Technologies (FAST'08), Feb. 2008, 14 pages.

* cited by examiner

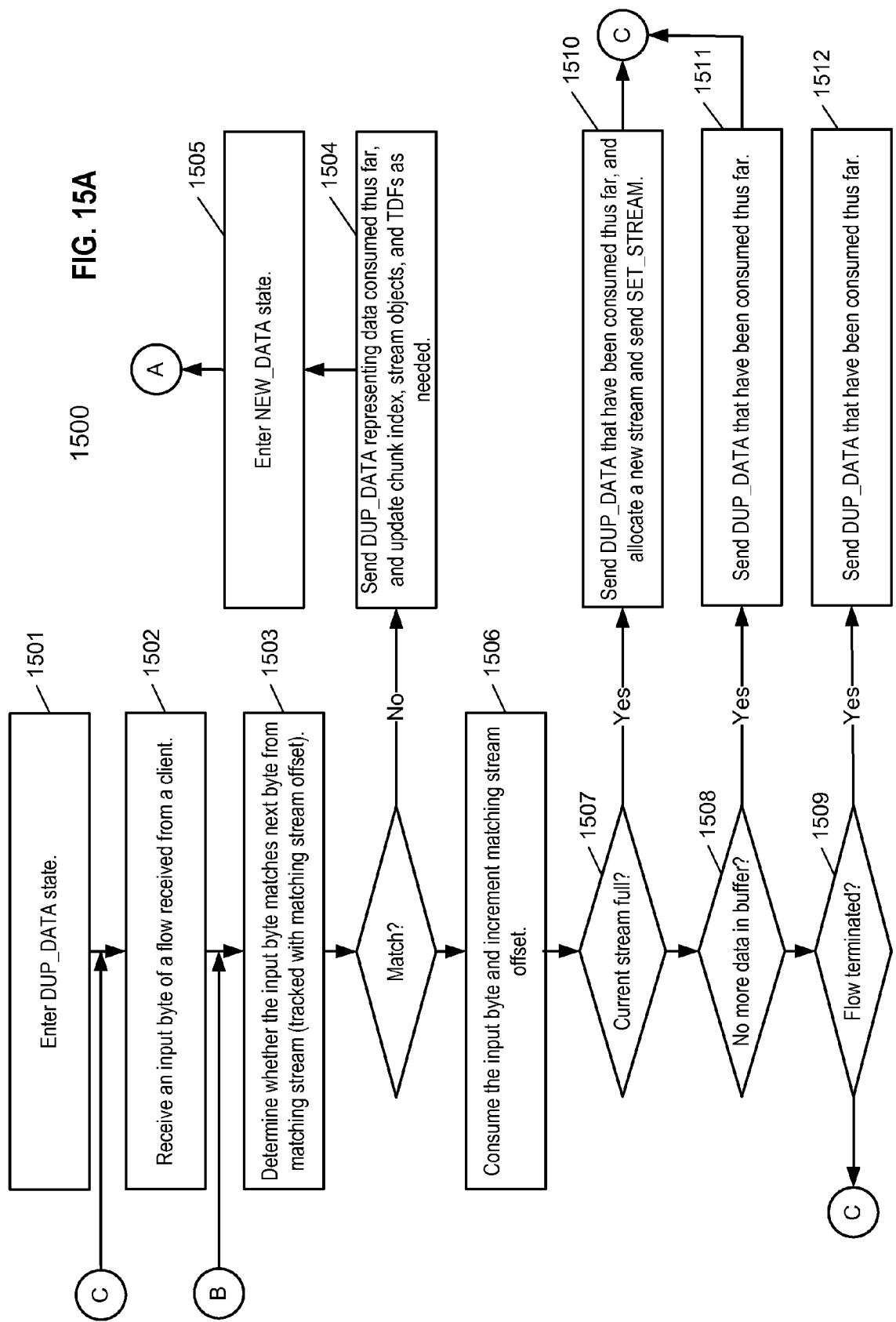

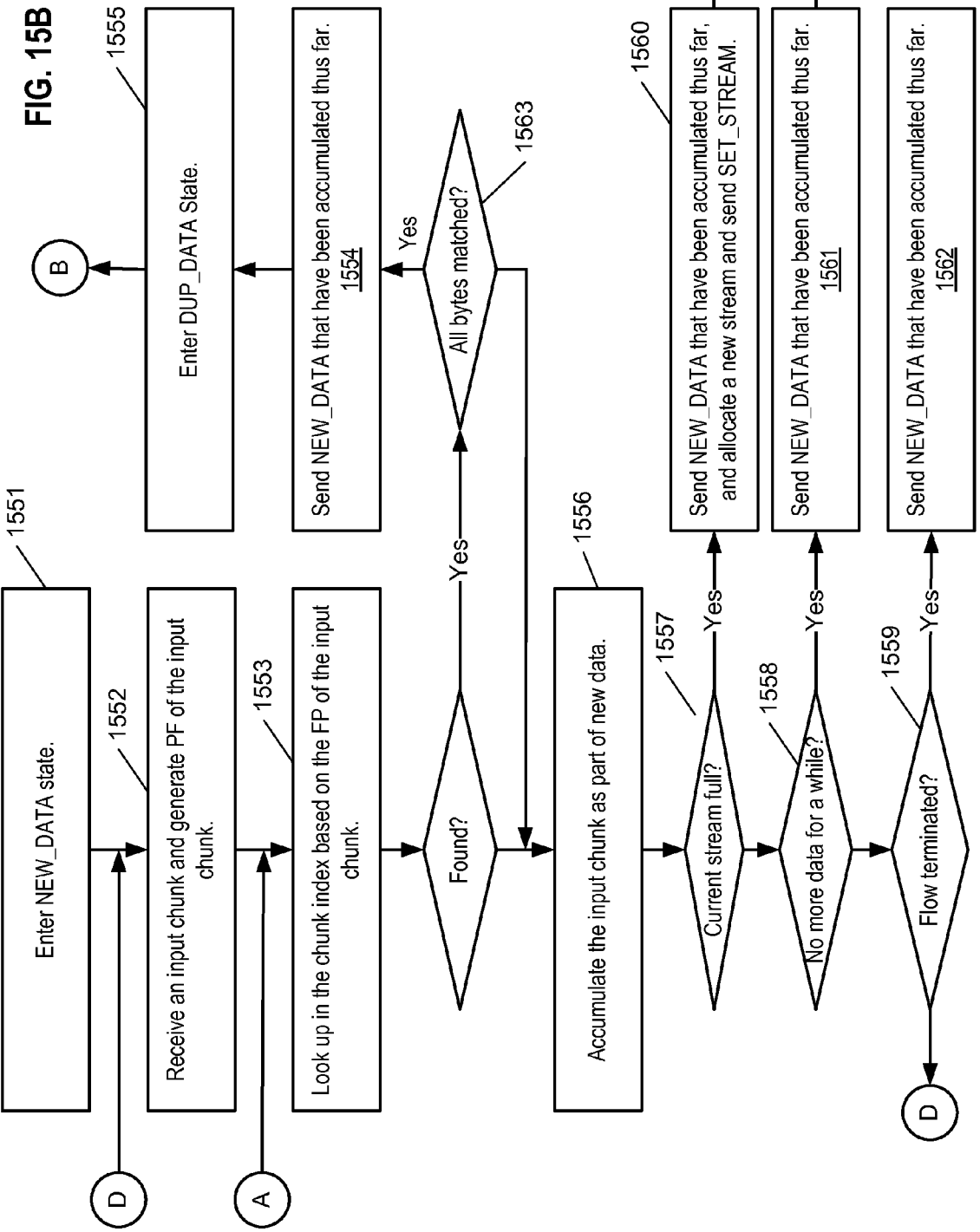

METHOD FOR OPTIMIZING WAN TRAFFIC

RELATED APPLICATIONS

This application is related to U.S. patent application Ser. No. 13/743,197, entitled "Method for Optimizing WAN Traffic with Efficient Indexing Scheme," filed Jan. 16, 2013, issued as U.S. Pat. No. 9,300,748 and U.S. patent application Ser. No. 13/743,200, entitled "Method for Optimizing WAN Traffic with Deduplicated Storage," filed Jan. 16, 2013, issued as U.S. Pat. No. 9,306,997. The disclosure of the above applications is incorporated by reference herein in its entirety.

FIELD OF THE INVENTION

Embodiments of the present invention relate generally to computer networking. More particularly, embodiments of the invention relate to optimizing wide area network (WAN) traffic.

BACKGROUND

Deduplication has become the common term used to identify any technique that attempts to remove duplicate data from a system, either for the purpose of saving disk space or network bandwidth. A deduplicating file system, for example, stores only one copy of a file, even if the file exists under multiple distinct paths in the file system tree. There are a number of different techniques for accomplishing this deduplication in file systems over the years.

Network deduplication, in contrast, refers to eliminating transfers of data between two parties if those transfers contain content that has already been transferred in the past. The first system to deduplicate data over a network was Muthitacharoen's low bandwidth file system (LBFS) described in "A Low-Bandwidth Network File System," In Proceedings of ACM SOSP, 2001. It is a client-server protocol in which both sides keep an index of the SHA-1 hashes of all of the file system blocks of which they are aware. To download a file from the server, a client first asks the server for only the SHA-1 hashes of the blocks of the file in question. The client then requests the data for only those blocks for which it does not already know the content (determined by checking the client's index). Likewise, before uploading new data to the server, the client sends only the SHA-1 hashes of the relevant blocks, and the server responds with a list of the blocks for which it does not already know the content. The client then uploads only the content of these unknown blocks.

A network proxy is a machine that intercepts network packets from one machine and possibly transforms them before forwarding them to their intended recipient. Such transformation may include modifying existing packets, dropping packets, or fabricating completely new packets. A hypertext transport protocol (HTTP) proxy is one example of a network proxy. A proxy can be either explicit or transparent, the distinction being whether one or both communication endpoints are explicitly configured to use the proxy or not. Network proxies may also be paired, with one proxy on either end of a connection. A virtual private network (VPN) can be implemented using two such proxies, with one proxy encrypting traffic from the local network before transmitting it into the public network, and the other proxy decrypting traffic from the public network and transmitting it on the remote network.

A deduplicating network proxy is one that, paired with another deduplicating proxy on the other end of a connection, attempts to reduce the transfer of duplicate data across the network between them. For example, assume Alice and Bob are separated by a pair of deduplicating proxies. Alice transmits a file between her computer and that of a friend, Bob. Bob changes one byte of the file and sends it back to Alice. For the second transfer, the deduplicating proxy closest to Bob will (ideally) only send to its peer proxy a notification that a transfer should take place and the value and offset of the byte Bob actually changed. The proxy closest to Alice will then replay the entire transfer to Alice, including the changed byte. For a large file, this differential transfer can conserve a great deal of network bandwidth between the two proxies.

Rabin fingerprinting is a technique for incrementally generating hashes of n-byte substrings of a large file, which has been described in "Fingerprinting by Random Polynomials," Technical Report TR-15-81, Center for Research in Computing Technology, Harvard University, 1981. In a naive implementation of LBFS that used fixed-size blocks, the insertion of a single byte at the beginning of a file would change the contents of all subsequent blocks (shifting them over one place), and thus change all of their SHA-1 hashes. As such, if a user were to download a file, insert a byte at the beginning, and upload the result, this naive version of LBFS would be unable to deduplicate the transfer. LBFS uses Rabin fingerprinting to identify similar substrings of network traffic in a way that was not subject to this offset problem. However, such techniques have not been very effective for optimizing WAN traffic.

BRIEF DESCRIPTION OF THE DRAWINGS

Embodiments of the invention are illustrated by way of example and not limitation in the figures of the accompanying drawings in which like references indicate similar elements.

FIGS. 15A and 15B are flow diagrams illustrating a method for optimizing WAN traffic according to another embodiment of the invention.

DETAILED DESCRIPTION

Figure 1A:
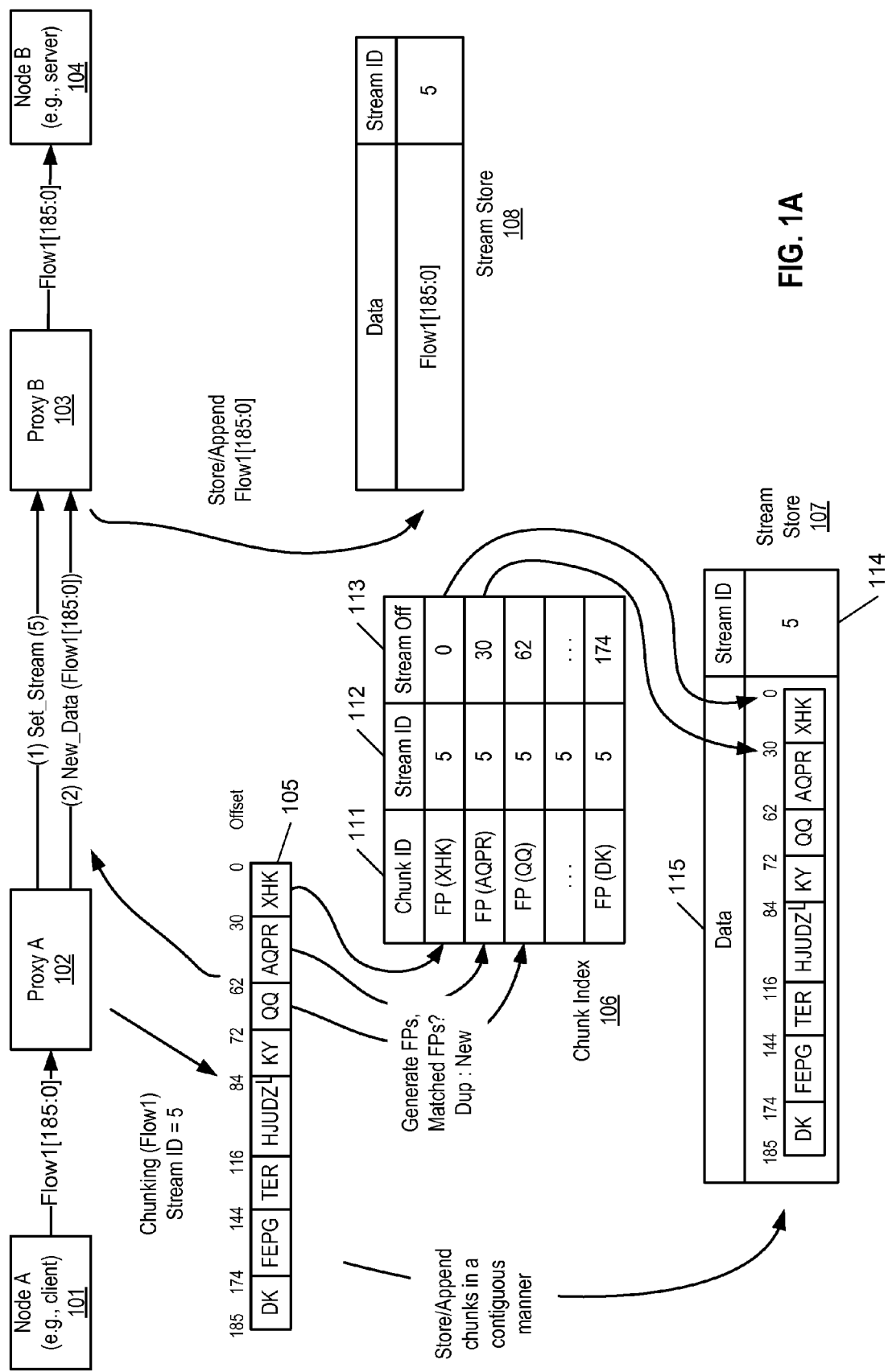
FIGS. 1A-1D are block diagrams illustrating a process of WAN traffic deduplication according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a network protocol is defined to be used between a local network proxy device and a remote network proxy device (simply referred to as a proxy herein) to communicate network deduplication information to reduce or eliminate transmitting duplicated data between the proxy peers. A proxy may be a router, an access point, and/or a network switch associated with a local area network (LAN) or a segment of a network. In one embodiment, when a local proxy communicates with a remote proxy, the local proxy is configured to keep track of the data to be sent to and/or received from the remote proxy. When subsequent data has been received from a client, either within the same flow or in a different flow, the local proxy examines the newly received data to determine whether the newly received data has been previously transmitted to the remote proxy, based on the information maintained by the local proxy concerning what has been previously transmitted to the remote proxy.

If the newly received data has been previously transmitted to the remote proxy, according to one embodiment, a message (e.g., DUP_DATA) is transmitted to the remote proxy indicating that this is duplicated data that has been previously transmitted to the remote proxy. In addition, the message further specifies where in the previously transmitted data (e.g., a particular previous stream, flow, or TCP session) contains the same newly received data, without having to transmit the actual data. It is assumed that the remote proxy maintains the information of all previously received data from the local proxy. Based on the message received from the local proxy, the remote proxy can identify the data previously received from the local proxy and transmit the same data to its client. As a result, the duplicated data is not transmitted over the network from the local proxy to the remote proxy. If it is determined the newly received data has not been previously transmitted to the remote proxy, a message containing the actual data (e.g., NEW_DATA) is then transmitted to the remote proxy.

Similarly, when a local proxy receives data from a client to be sent to a remote proxy, the local proxy may determine whether the same data has been previously received from the remote proxy through another network session (e.g., TCP session). If it is the same data previously received from the remote proxy, according to one embodiment, the local proxy transmits a message (e.g., DUP_DATA) to the remote proxy indicating that this is the duplicated data that has been previously received from the remote proxy. In addition, the message further specifies where in a previous communication session (e.g., a particular previous stream, flow, or TCP session) contains the deduplicated data, without sending the actual duplicated data. As a result, the remote proxy can identify the deduplicated data from its local storage and send the same to the corresponding client of the remote proxy.

According to one embodiment, when a local proxy receives a flow of data to be transmitted to a remote proxy, the local proxy performs chunking on the flow as the flow of data is being received, using a predetermined chunking algorithm to generate chunks of the flow. The local proxy indexes each chunk in a chunk index based on a chunk identifier (ID) that is generated based on a fingerprint of the corresponding chunk. A fingerprint of a chunk may be generated by hashing at least a portion of content of the chunk using a variety of hash algorithms (e.g., SHA-1). In addition, the chunks of the flow are cached in a local storage of the local proxy in a continuous manner (e.g., contiguous chunks in the stream). The chunk index includes multiple entries, each corresponding to one of the chunks of a flow, where a chunk index entry includes information identifying where in the cached flow the corresponding chunk is located, such that the corresponding chunk can be subsequently retrieved from the local storage (also referred to as a stream store). If the chunks have not been sent to the remote proxy, the chunks are sent to the remote proxy in one or more streams (e.g., via NEW_DATA), each being identified by a unique stream ID. A stream represents consecutive chunks of a flow or a segment of a flow that is transmitted to the remote proxy in a given transmission session. If a flow contains multiple streams, each chunk index entry may further include information (e.g., a stream ID) identifying which of the streams the corresponding chunk is associated with.

According to one embodiment, for each chunk being processed, processing logic of the local proxy performs a lookup operation in the chunk index based on a chunk ID of the chunk to determine whether the chunk in question has been previously transmitted to the remote proxy. If a chunk index entry matching a chunk ID of the chunk is found in the chunk index, it means that the chunk has been previously sent to the remote proxy. In this situation, information concerning the chunk is obtained from the chunk index, such as a stream ID of a previously transmitted stream and an offset of the previously transmitted stream in which the chunk was transmitted to the remote proxy. The local proxy then transmits a message (e.g., DUP_DATA) containing such information to the remote proxy to allow the remote proxy to identify the corresponding data previously received from the local proxy or the corresponding data previously transmitted to the local proxy by the remote proxy, without having the local proxy to retransmit the same data to the remote proxy.

According to one embodiment, instead of indexing every chunk of a flow, which may require a large chunk index data structure, an indexing scheme is employed to selectively index certain chunks of the flow to reduce the size of the chunk index. For example, chunks located at the beginning of a flow may be indexed more frequently than those located at the end of the flow. The rationale behind this selective indexing is that data at the beginning of a flow (e.g., email headers) tends to change more frequently compared to the data located at the end of the flow (e.g., attachment) in view of the previously transmitted data. In one embodiment, whether a particular chunk should be indexed is determined based on a pattern of certain bit(s) of its chunk ID (e.g., least significant bit(s) or LSB(s)). If the pattern of the predefined bit(s) matches a predetermined pattern, the corresponding chunk will be indexed in the chunk index; otherwise, it will not be indexed. As a result, the size of the chunk index is reduced.

According to one embodiment, instead of caching each of the entire flows transmitted to or received from a remote proxy, a deduplication scheme for storage is employed at a local proxy to reduce the storage space for caching the flows. In some situations, some flows may contain common data (e.g., same attachment in different emails or same movie in different download sessions) and if those flows are entirely cached within the local proxy, duplicated data may be stored in the local proxy, even though the proxy transmitted no duplicate data across the network. In one embodiment, a stream store includes multiple stream objects and one or more transmitted data files (TDFs). The TDFs contain only unique chunks; there are no duplicates. Each stream object includes one or more TDF references and each TDF reference includes a pointer referencing at least a portion of the content stored in one or more chunks of the TDFs. Those referenced chunks collectively represent a specific stream of data associated with the stream object. When multiple streams contain overlapped or duplicated chunks of data, each of the corresponding stream objects associated with those streams includes at least one TDF reference referencing the same TDF(s). In one embodiment, each TDF reference of a stream object includes a TDF ID identifying the corresponding TDF, an offset and size of a segment of the TDF corresponds to at least a segment of the stream associated with the TDF reference. As a result, the storage space to cache the transmitted data can be reduced. Similarly, the remote proxy may implement the same techniques as described above. Note that as with DUP_DATA messages, references to TDFs need not end on chunk boundaries, although they start on chunk boundaries as a consequence of the way in which the proxy discovers them, but they end only when the proxy finds a non-matching byte.

FIGS. 1A-1D are block diagrams illustrating a process of WAN traffic deduplication according to one embodiment of the invention. Referring to FIG. 1A, node 101 is communicatively coupled to node 104 over a WAN (e.g., the Internet) via proxy 102 and proxy 103, respectively. Proxy 102 may be associated with a LAN or segment of a network in which node 101 is located. Similarly, proxy 103 may be associated with a LAN or segment of a network in which node 104 is located. Any of proxies 102-103 may represent a router (e.g., a gateway device), an access point (AP), and/or a network switch.

Figure 12:
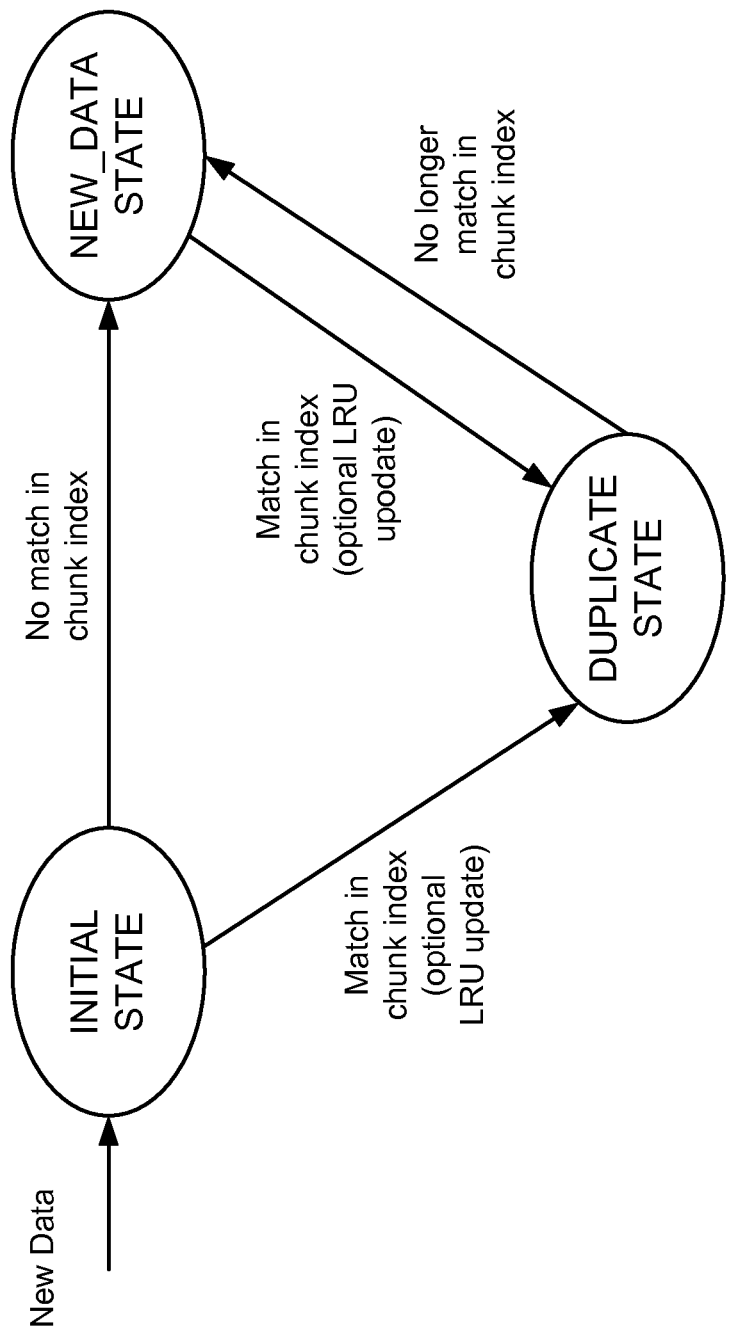
FIG. 12 is a state diagram illustrating states in which a proxy operates according to one embodiment of the invention.

According to some embodiments, a proxy (e.g., proxy 102 or proxy 103) operates in one of three modes or states for each flow: initial mode (also referred to as INITIAL state), new data mode (also referred to as NEW_DATA state), and duplicate data mode (also referred to as DUP_DATA state). An example of such a state diagram is shown in FIG. 12. Typically, it starts each flow in the initial mode. It transitions to the other modes as described below. Once the proxy has identified a chunk in the bytes sent from a client (e.g., node 101), according to one embodiment, the proxy computes a hash over the entire chunk by taking its SHA-1 and discarding all but certain least significant bits (LSBs) such as 32 LSBs. The proxy then checks its chunk index for any matching entries for this peer, optional generation number (representing a particular version of cached data), and hash.

Each matching entry from the chunk index indicates that some previous chunks of the current flow or another flow to the same peer had the same hash as the current chunk. Because the hash is only 32 bits long in this example, a system with several billion unique chunks will have many hash collisions. As such, a matching entry only indicates that an earlier flow may have contained the same data as the current flow. To determine whether the current chunk is in fact a duplicate, the proxy uses the stream ID and offset stored in the chunk index to look up the files (e.g., stream store) in which the bytes of the previous chunk with the same hash are stored. It then reads the data from those files and compares the chunk from its disk with the one from the current flow byte by byte. If the chunks are in fact identical, there is a match. If the proxy finds a match, it enters a duplicate data mode. If it does not find a match, it enters a new data mode.

In a duplicate data mode, according to one embodiment, the proxy continues reading data from the client and comparing it to the bytes of the stream that it identified as a duplicate when it first entered duplicate data mode. If the proxy (e.g., proxy 102) runs out of available data to read from the client (e.g., client 101), if it exhausts the available space in the current stream, or if it finds a byte that does not match between the two, it sends a DUP_DATA message to the server proxy. This message contains the stream ID, offset, and length of the sequence of duplicated bytes.

In the case where the proxy finds a non-matching byte in duplicate data mode, it transitions to new data mode after sending the DUP_DATA message. In the case where the proxy sends a DUP_DATA message because it has run out of bytes to read from the client, it resumes operating in duplicate data mode as soon as more bytes become available from the client. In the case where the proxy sends a DUP_DATA message because it has run out of space in the current stream, it picks a new stream ID, sends a new SET_STREAM message to the server proxy, and resumes operating in duplicate data mode as before. A SET_STREAM message includes a stream ID indicating that subsequent data to be transmitted over is associated with a stream identified by the stream ID. Whenever a proxy switches to using a different stream, it first sends a SET_STREAM message to specify a stream ID of an upcoming new stream.

When in new data mode, according to one embodiment, the proxy reads from the flow until it finds a matching chunk in an earlier stream, until it exhausts the space in the current stream, or until there are no more bytes available to read from the client. In each case, the proxy sends a NEW_DATA message to the server proxy. This message contains the length of the sequence of new bytes followed by the bytes themselves. In the case where the proxy finds a matching chunk while in the new data mode, it transitions to the duplicate data mode after sending the NEW_DATA message. In the case where the proxy sends a NEW_DATA message because it has run out of bytes to read from the client, it resumes operating in new data mode as soon as more bytes become available from the client. In the case where the proxy sends a NEW_DATA message because it has run out of space in the current stream, it picks a new stream ID, sends a new SET_STREAM message to the server proxy, and resumes operating in new data mode as before.

Referring back to FIG. 1A, when node 101 attempts to send data to node 104, nodes 101 and 104 establish a TCP connection via proxies 102-103. Once the TCP connection has been established, node 101 can start sending data to node 104 over the TCP connection. In this example, it is assumed that node 101 sends a first flow Flow1[185:0], where Flow1 [185:0] represents a flow having 186 bytes of data starting from offset 0 to offset 185. When at least some of the Flow1 reaches proxy 102, the received data is buffered by proxy 102 as buffered data 105. In addition, proxy 102 selects or allocates a stream ID that is unique to the local proxy and/or the direction of the WAN traffic (e.g., transmission or reception). In this example, a stream ID of 5 is allocated to represent at least a portion of Flow 1. Once the new stream ID has been allocated, proxy 102 sends a SET_STREAM (stream ID=5) message to proxy 103 to indicate that the data that will be transmitted over will be part of that stream. Proxy 102 then starts processing the received data starting at offset zero while the remaining data is arriving from node 101.

According to one embodiment, a proxy can operate in an INIT state, a NEW_DATA state, and a DUP_DATA state, which will be described in details further below. At this point, proxy 102 operates in an INIT state and proxy 102 performs chunking operation on the received data 105 starting from offset zero, using a predetermined chunking algorithm. In one embodiment, as proxy 102 receives data from client 101, it computes for the $i^{th}$ byte $b_i$ a hash h (e.g., Rabin hash) as $$h(b_i) = h(b_{i-1}) - p^{beta} * b_{i-63} p * b_i (\text{mod } M)$$

where $M=2^{60}$, $p=1048583$, beta=64, and $h(b_i)=0$ for i<0. Byte 0 is the first byte of the first chunk. Byte $b_i$ is the last byte of a chunk if any of the following are true:

If $h(b_i)=0$ (mod 32), and $b_i$ is at least 16 bytes after the first byte in its chunk.

If $b_i$ is at least 128 bytes after the first byte in its chunk.

If there is no more data currently available to be read from the client after $b_i$ (either because the client has closed the write side of its flow, or because it is waiting before sending more data).

If bi is the last byte of a chunk, then bi+1 is the first byte of the next chunk.

Referring back to FIG. 1A, in this example, it is assumed that the buffered data 105 is chunked and a first overall chunk XHK (at offset zero and having a size of 30 bytes) is generated. Once the first overall chunk XHK is found, processing logic generates a chunk ID based on a fingerprint of the chunk by hashing the content of the chunk, for example, using a variety of hash algorithms such as SHA-1. Based on the chunk ID, processing logic performs a lookup operation at chunk index 106, which may be implemented in a variety of data structures. In this example, chunk index 106 includes multiple entries each corresponding to one of the chunks that have been transmitted to (and/or received from) a remote proxy 103.

If a chunk index entry matching the chunk ID of the first overall chunk has been found, it means that the same chunk may have been sent to remote proxy 103 previously. However, since the chunk ID is generated by hashing the content of the chunk, a hash collision may be possible (e.g., hashing different content generates the same hash value). In one embodiment, in order to ensure that the chunk has indeed been transmitted to proxy 103 previously, the chunk currently processed from buffered data 105 and the corresponding chunk associated with the matching chunk index entry and cached in the local storage such as stream store 107 are compared byte-by-byte.

In this example, it is assumed that FIG. 1A is in a situation where Flow 1 is the first overall flow that has been received by proxy 102 to be transmitted to proxy 103. Thus, the chunk index 106 is empty prior to processing buffered data 105 and there is no chunk index entry that matches the chunk ID of chunk XHK. Therefore, this is new data from the point of view of proxy 103 and proxy 102 enters a NEW_DATA state. In addition, proxy 102 allocates a new chunk index entry specific to peer proxy 103. In this example, an entry for chunk XHK is allocated from chunk index 106. According to one embodiment, each entry of chunk index 106 includes a chunk ID field 111 to store the fingerprint of the chunk, a stream ID field 112 to store a stream ID associated with the chunk, and an offset field 113 to specify where in the stream the corresponding chunk is located. In this example, chunk XHK has a stream ID of 5 and is located at the offset zero of stream 5. Further, the chunk is cached in stream store 107. In this example, there is only one stream to be populated, which is identified by stream ID field 114 and its content is stored in data field 115. Stream store 107 may represent a single file containing multiple streams or multiple files each corresponding to one stream.

Once the first overall chunk XHK has been processed and categorized as new data, according to one embodiment, instead of immediately transmitting chunk XHK to proxy 103, processing logic continues processing a next chunk, in this example, chunk AQPR, and so on, until a chunk has been located in chunk index 106 or the end of the flow has been reached. When a fingerprint of a chunk has been located in chunk index, it means that a duplicated chunk has been identified, upon which proxy 102 will enter DUP_DATA state, which will be described in details further below. In this example, the entire Flow 1 will be considered as new data and entire Flow 1 is cached in stream store 107. Once the processing logic reaches the end of Flow 1 or client 101 terminates the flow or TCP session, whatever that has been accumulated as new data is then transmitted to proxy 103 in a NEW_DATA message. In this example, the entire Flow 1 is transmitted in a NEW_DATA (Flow1 [185:0]) message to proxy 103.

Note that in this example, the size of a stream is larger than the size of Flow 1 and therefore the entire Flow 1 can be transmitted within a single stream, stream 5. However, if the size of a stream is smaller than the size of Flow 1, multiple streams can be utilized to carry the entire Flow 1. In such a situation, every time proxy 102 transmits a new stream identified by a new stream ID, proxy 102 sends SET_STREAM (new stream ID) to proxy 103 prior to sending the data of the new stream using the NEW_DATA messages. Once proxy 103 receives Flow 1 from proxy 102, proxy 103 also caches the received Flow 1 in its stream store 108, which may have the same or similar structure as of stream store 107. Proxy 103 then transmits the received Flow1 [185:0] to its client 104. Proxy 103 may also optionally maintain a chunk index similar to chunk index 106 of proxy 102. Note that the protocol described herein works even if proxy 103 does not keep a chunk index. Adding a chunk index to the receiving proxy is another aspect of the invention. Moreover, even if a chunk index is added to the receiving proxy, it may use a completely different chunking algorithm that produces completely different boundaries. In fact, neither proxy can determine that the other is using a chunk index. Each can tell only that its peer is somehow discovering duplicate data.

Figure 1B:
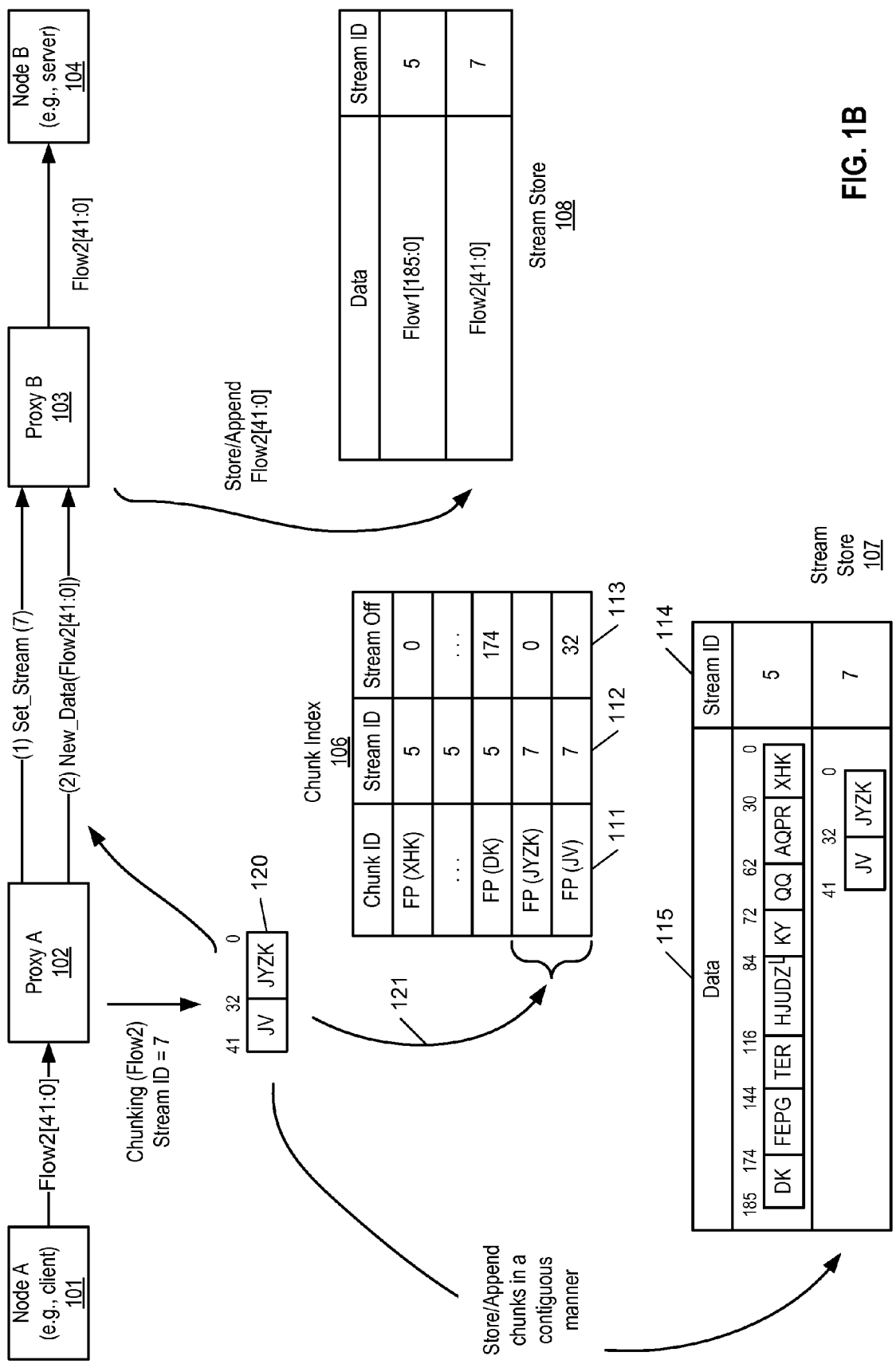

Referring to FIG. 1B, proxy 102 now starts receiving a second flow, Flow 2, from client 101, assuming the corresponding TCP session has been initialized. In this example as shown in FIG. 1B, once proxy 102 receives the initial portion of Flow 2, proxy 102 allocates a new stream ID of 7 for a new stream representing the new flow and a SET_STREAM(7) is transmitted to proxy 103. Proxy 102 then starts performing a chunking process as described above. In this example, chunks JYZK and JV have been generated as part of buffered data 120. Similar to the operations as shown in FIG. 1A, fingerprints of chunks JYZK and JV are generated and a lookup is performed in chunk index 106. Since chunks JYZK and JV are new and have not been cached in proxy 102, new chunk index entries are allocated and populated via path 121. In this example, both chunks JYZK and JV are associated with a stream ID of 7. Meanwhile, proxy 102 enters a NEW_DATA state and the chunks JYZK and JV are then cached in stream store 107 of proxy 102. In addition, chunks JYZK and JV are transmitted to proxy 103 in a NEW_DATA message. The chunks JYZK and JV are then forwarded to node 104 and cached by proxy 103 in stream store 107.

Figure 1C:
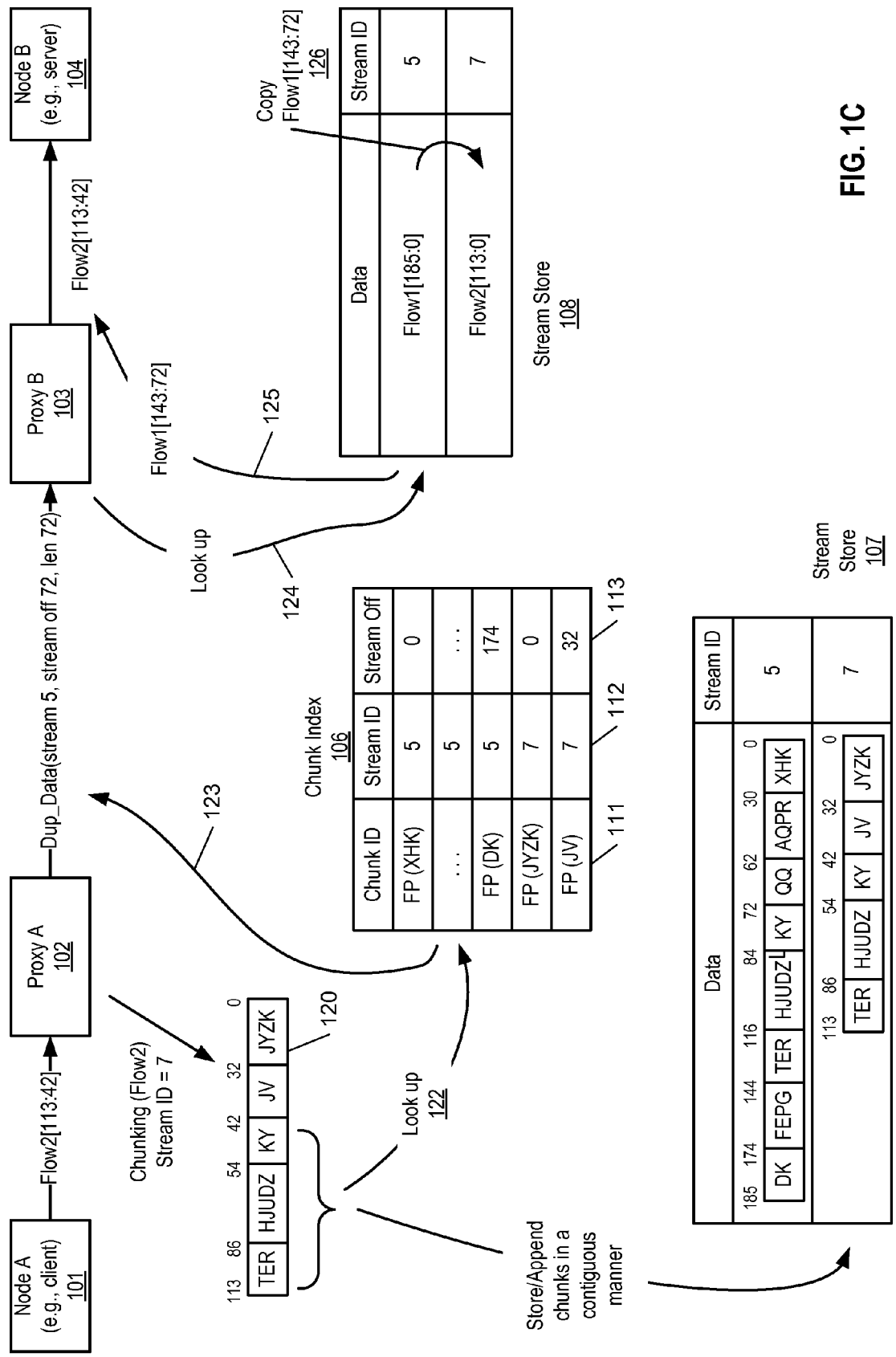

Referring now to FIG. 1C, after processing chunks JYZK and JV, proxy 102 continues processing the remaining data of Flow 2, including chunking to generate chunks and hashing to generate fingerprints. In this example, chunks KY, HJUDZ and TER and their respective fingerprints have been generated. Based on the fingerprints of chunks KY, HJUDZ and TER, a lookup operation is performed in chunk index 106 to determine whether chunks KY, HJUDZ and TER have been previously sent to proxy 103 and cached in stream store 107. In one embodiment, starting from chunk KY, a fingerprint of chunk KY is compared to those stored in chunk index 106.

Note that in this example, chunk KY exists in stream 5 at the offset of 72. Thus, a chunk index entry corresponding to chunk KY will be found in chunk index 106 and associated with stream 5. Once there is a match in chunk index 106, as described above, a byte-to-byte comparison is performed between chunk KY from buffered data 120 and chunk KY of matching stream 5. If all bytes are matched, chunk KY is considered as a duplicated chunk and proxy 102 transitions to a DUP_DATA state from a NEW_DATA state. In addition, the chunk being processed is cached in stream store 106 (even though it may be a duplicated chunk). In one embodiment, instead of immediately sending a DUP_DATA message for chunk KY to proxy 103, processing logic continues to examine subsequent bytes of the flow to see if they are duplicates as well. If the next byte is also a duplicated byte, that byte is also recorded without sending a DUP_DATA message and the processing logic keeps examining subsequent bytes until it finds a non-duplicated byte or the end of the flow. At that point, proxy 102 transitions from the DUP_DATA state back to the NEW_DATA state, and a DUP_DATA message having information identifying all the duplicated bytes that have been recorded up to that point is transmitted to proxy 103.

In this example, chunks KY, HJUDZ and TER exist in stream 5 and thus their fingerprints can be found in chunk index 106. It is assumed that the very next byte after chunk TER is a new byte, as shown as chunk DSK in FIG. 1D. Once it is determined the next byte is no longer a duplicated byte, a DUP_DATA message having information identifying the duplicated bytes in chunks KY, HJUDZ and TER is obtained from chunk index 106 and sent to proxy 103 via path 123. The DUP_DATA includes a stream ID identifying a stream 5 that has been previously sent to proxy 103 and the location and size of the duplicated bytes (e.g., offset and length). Note that the duplicated data represented by a DUP_DATA message starts at the boundary of a chunk; however, it does not necessarily end at the boundary of a chunk. That is, once a non-duplicated byte is found, the duplicated data segment ends, even in the middle of a chunk. In this example, the granularity is at a byte level; however, it may be processed at a chunk level or other levels.

Once the DUP_DATA message is received by proxy 103, proxy 103 performs a lookup via path 124 based on the information obtained from the DUP_DATA message to identify the data that has been previously received and cached in stream store 108. In this example, Proxy 103 extracts data from stream 5 starting from offset 72 to offset 143 for a total of 72 bytes and transmits the extracted data to the destination via path 125, which may be node 104 in this example. In addition, the identified data, Flow1 [143:72], is copied via path 126 from stream 5 to stream 7 becoming part of Flow 2.

Figure 1D:
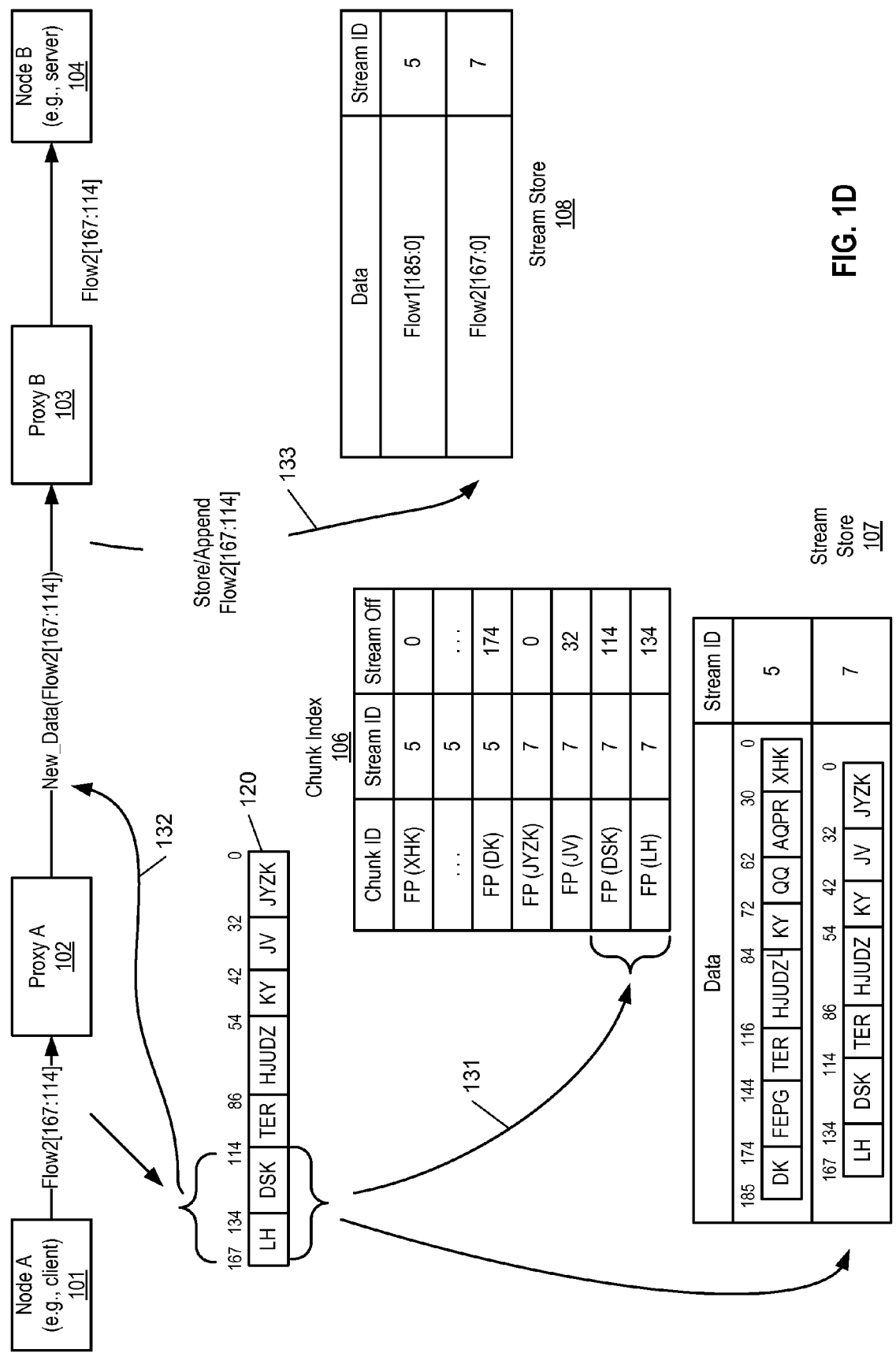

Referring now to FIG. 1D, proxy 102 receives the remaining data of Flow 2 from node 101, performs chunking and lookup operations in chunk index 106, and caches the data in stream store 107. It is assumed that, in this example, remaining chunks DSK and LH are new chunks. As a result, new chunk index entries corresponding to chunks DSK and LH are created in chunk index 106 via path 131. Once the first byte of chunk DSK (after duplicated chunk TER) is determined as a new byte, proxy 102 transitions from the DUP_DATA state back to the NEW_DATA state, and a NEW_DATA message containing chunks DSK and LH is sent to proxy 103 via path 132. Once proxy 103 receives chunks DSK and LH via the NEW_DATA message, it forwards the received chunks DSK and LH to its client and caches the same in stream store 108 via path 133. Note that in this embodiment, the data cached in stream stores 107-108 may contain duplicated data. In another embodiment, such data can be stored in a deduplicated manner, which will be described in details further below.

For the purpose of illustration, operations of proxy 102 as a sender proxy sending WAN traffic to remote proxy 103 are described herein with respect to FIGS. 1A-1D; however, the same or similar operations and/or architectures may also be applied to remote proxy 103 when sending WAN traffic in the opposite direction back to proxy 102. Also note that through this application, a proxy may communicate with multiple proxies of multiple LANs or network segments, which form multiple pairs of proxy peers. As a result, a proxy may maintain a specific chunk index and/or stream store for each of the remote proxy peers it communicates with. A stream ID may be unique amongst all of the proxy peers or alternatively, there can be duplicated stream IDs used in communicating with different peers as long as each stream sent to a particular proxy peer is identified by a unique stream ID with respect to that proxy peer.

Figure 2A:
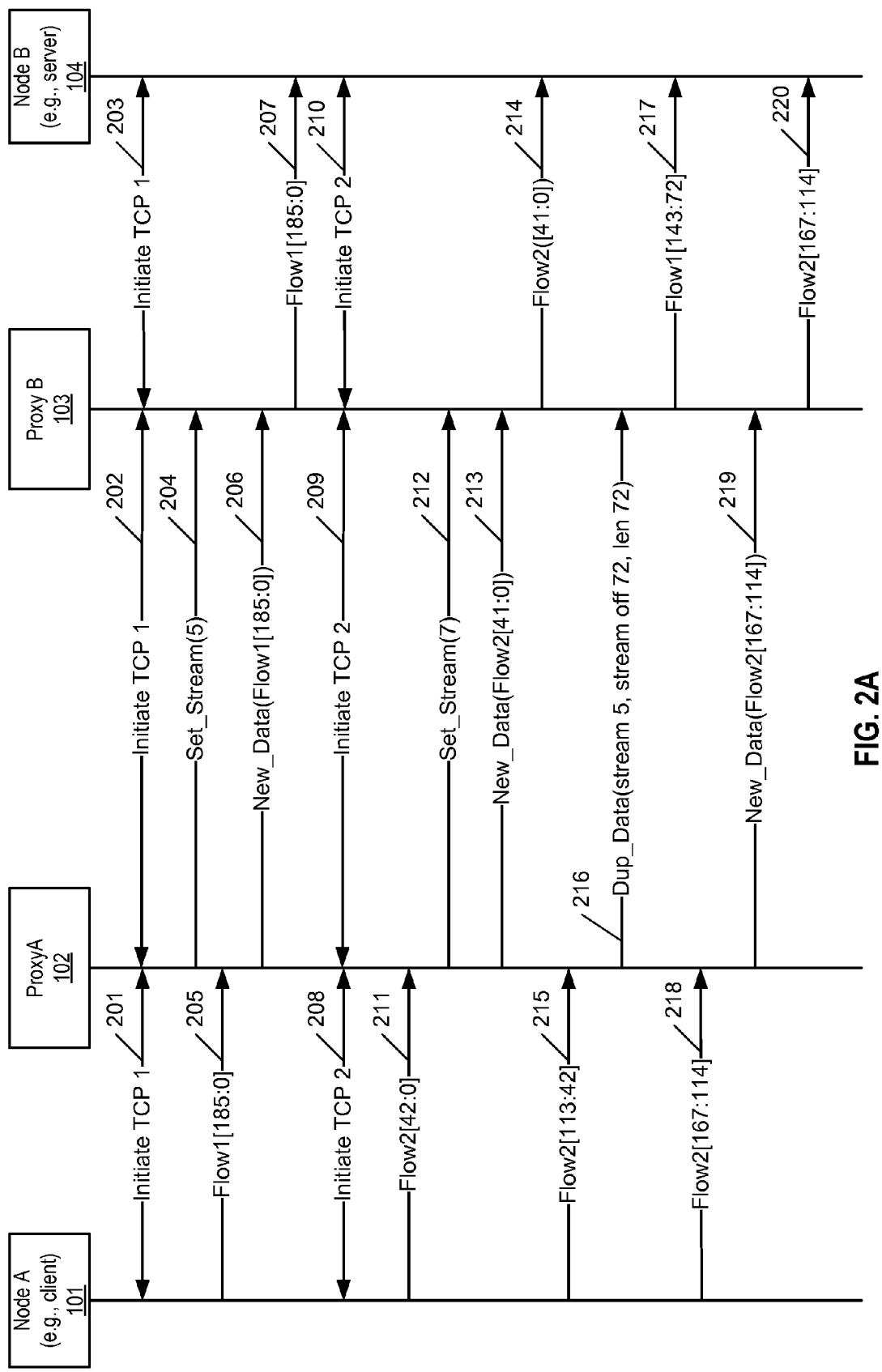
FIGS. 2A and 2B are transactional diagrams illustrating transactions amongst the nodes according to certain embodiments of the invention.

FIG. 2A is a transactional diagram illustrating transactions amongst the nodes according to one embodiment of the invention. The transactions as shown in FIG. 2A represent the major transactions as shown in FIGS. 1A-1D. Referring to FIG. 2A, when node 101 attempts to communicate with node 104, it establishes via transactions 201-203 a TCP connection with node 104 via proxies 102-103. Typically, when node 101 initiates a connection with node 104 by sending a SYN packet, proxy 102 passes the SYN to proxy 103 which passes it on to node 104. If node 104 responds with a SYNACK, proxy 103 adds an entry to its flow table for the new TCP flow and forwards the SYNACK to proxy 102. The flow table is indexed by node 101's IP, node 101's port, node 104's IP, and node 104's port, and it stores state relevant to deduplicating the flow. On receiving the SYN-ACK, proxy 102 likewise adds an entry to its flow table and forwards the SYNACK to node 101. At this point a TCP flow has been established between node 101 and node 104.

Once the TCP connection has been established, proxy 102 may select a new stream ID, in this example, a stream ID of 5, and sends a SET_STREAM(5) to proxy 103 via transaction 204. Subsequently when proxy 102 starts receiving Flow 1 from node 101 via transaction 205, proxy 102 performs chunking and deduplication operations as described above. In this example, the entire Flow 1 is new and has not been transmitted to proxy 103 previously. Thus, proxy 102 sends a NEW_DATA message containing the content of the entire Flow 1 to proxy 103 via transaction 206 and proxy 103 caches the received data and forwards the same to node 104 via transaction 207.

Subsequently, when proxy 102 receives another flow, Flow 2, from node 101, assuming this is a different flow via a separate TCP connection, node 101, proxy 102, proxy 103, and node 104 communicate with each other via transactions 208-210 to establish a second TCP connection. Similar to the operations described above, when proxy 102 starts receiving Flow 2 via transaction 211, it selects a new stream ID, in this example, stream ID of 7, and sends a SET_STREAM (7) to proxy 103 via transaction 212. Note that the new stream ID may be selected and set once the second TCP connection has been established and prior to receiving Flow 2. In this example as described above, the first portion of Flow2[42:0] is new. As a result, proxy 102 caches Flow2[42:0] and sends a NEW_DATA containing Flow2[42:0] to proxy 103 via transaction 213 and proxy 103 caches and forward the same to node 104 via transaction 214.

Subsequently, when proxy 102 receives Flow2[113:42] via transaction 215, assuming this portion is duplicated portion from stream 5, proxy 102 performs caching, chunking, and lookup, and it sends a DUP_DATA containing information identifying the duplicated data from a previously sent stream (in this example, stream 5) to proxy 103 via transaction 216. In response, proxy 103 performs lookup, retrieves the duplicated data from locally cached previously received stream, and sends the data to node 104 via transaction 217. Similarly, for the remaining Flow2 received via transaction 218, assuming such a portion is new, proxy 102 sends a NEW_DATA containing the new portion of Flow 2 to proxy 103 via transaction 219, and proxy 103 forwards the new data to node 104 via transaction 220.

Figure 2B:
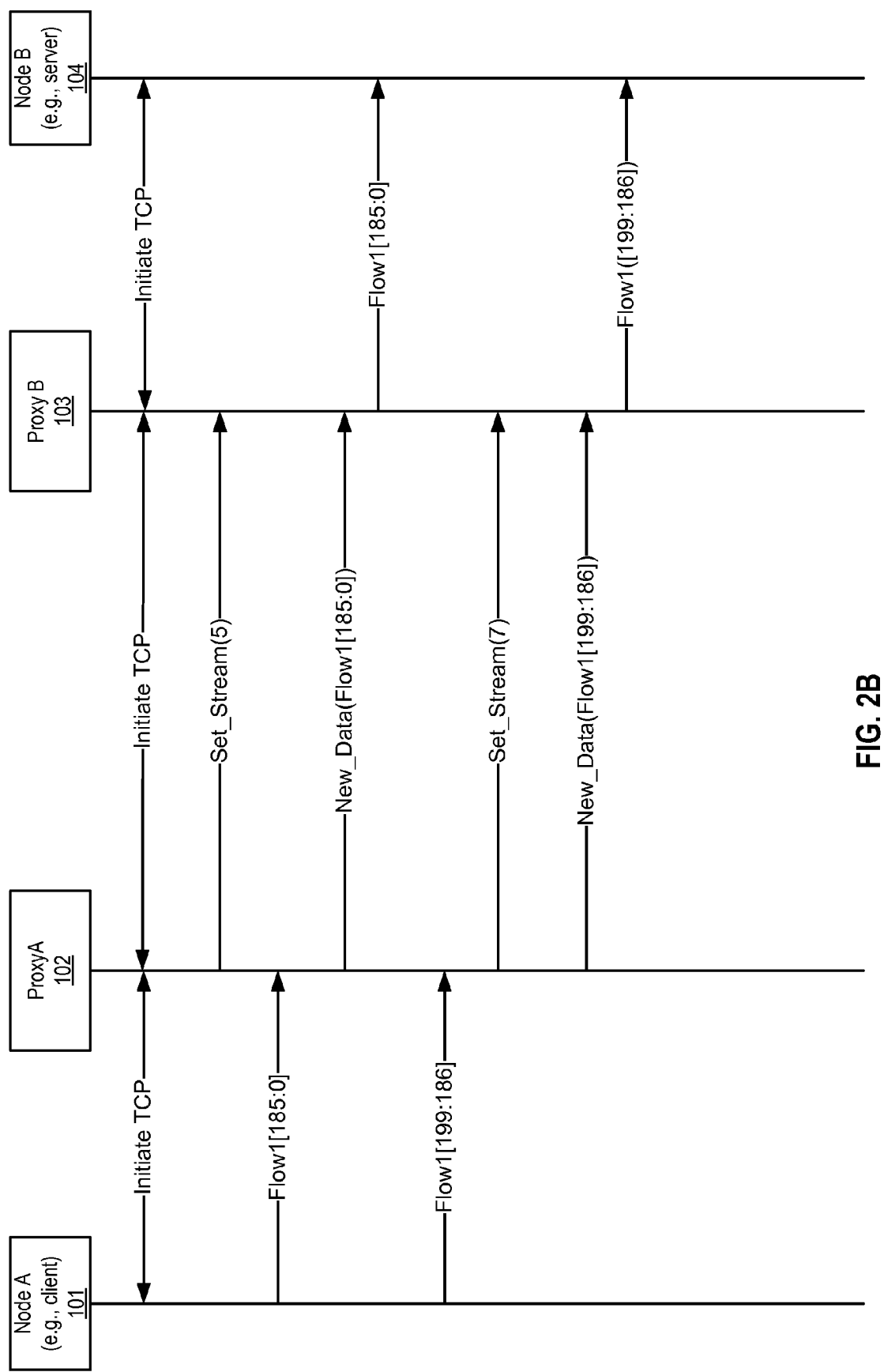

Note that in the configuration as shown in FIG. 2A, it is assumed that the size of a stream is larger than Flow 1 and Flow 2, where the streams are transmitted over different TCP sessions. In another configuration as shown in FIG. 2B, the size of Flow 1 in this example is larger than the size of a stream. For example, assuming that the size of a stream is 186 bytes while Flow 1 has a size of 200 bytes. In this situation, within the same TCP session, two different streams, stream 5 and stream 7, are utilized to transmit the entire Flow 1. Proxy 102 then has to send SET_STREAM messages to proxy 103 twice.

According to some embodiments, in some situations, when a local proxy is about to send data to a remote proxy, some of the data may have been previously received from the remote proxy via another communication session. Since the local proxy keeps track of the data it has received from the remote proxy, the local proxy can use the protocol messages described above, such as DUP_DATA message, to inform the remote proxy that this the same data the local proxy has received from the remote proxy previously. As a result, the local proxy does not have to retransmit the duplicated data to the remote proxy. In one embodiment, in order to keep track of what data has been received from or transmitted to a remote proxy peer, the chunk index of a local proxy may include additional information indicating the direction of the transmitted or received data with respect to a remote proxy.

Figure 3A:
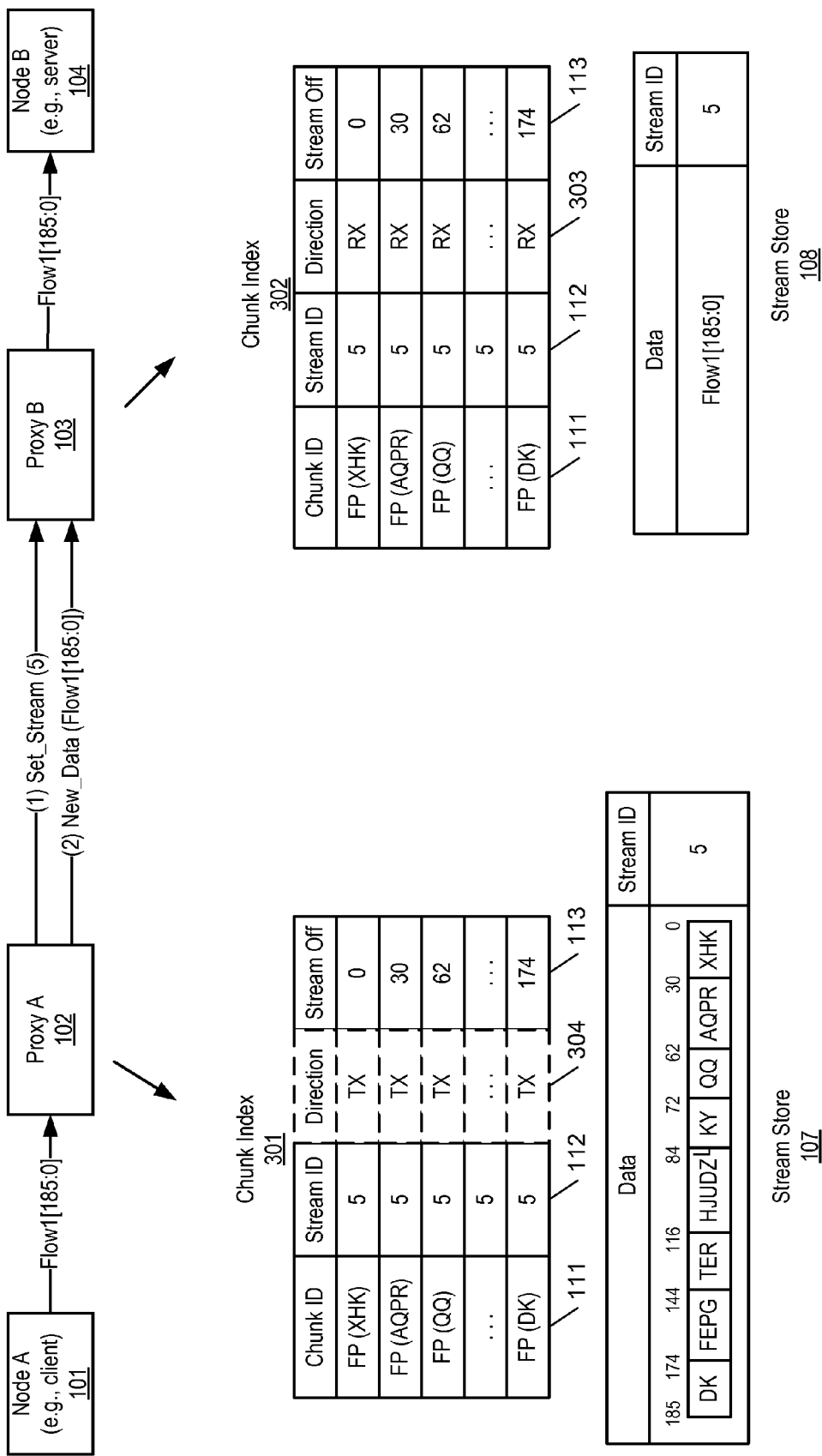
FIGS. 3A and 3B are block diagram illustrating a system for optimizing WAN traffic according to another embodiment of the invention.
Figure 3B:
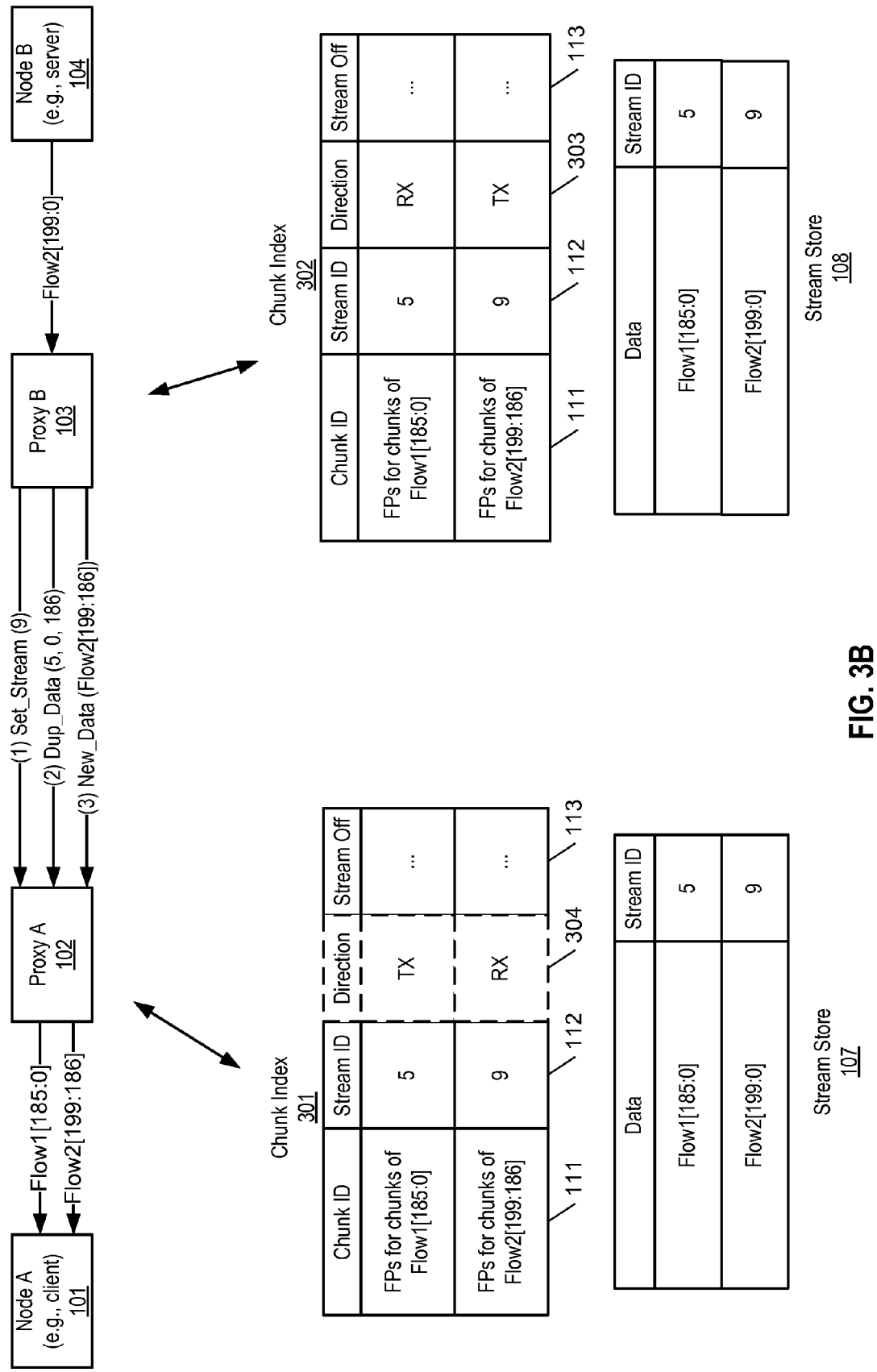

FIGS. 3A and 3B are block diagram illustrating a system for optimizing WAN traffic according to another embodiment of the invention. Referring to FIG. 3A, similar to the configuration as shown in FIGS. 1A-1D, proxy 102 maintains a chunk index 301 to keep track of data transmitted to proxy 103, which is a proxy peer to proxy 102. In one embodiment, proxy 103 also maintains a chunk index 302 to keep track of data received from proxy 102 and/or sent to proxy 102. In addition, chunk index 302 further includes information to keep track the direction of which the data has been processed. In this example, in addition to fields 111-113 as described above, each entry of chunk index 302 further includes direction field 303 indicating a direction (e.g., transmitted or received) of the data associated with the entry. In one embodiment, chunk index 301 of proxy 102 may optionally includes direction field 304 for the similar purpose.

In this example as shown in FIG. 3A, it is assumed that, similar to the operations with respect to FIG. 1A, proxy 102 has sent the entire Flow 1 to proxy 103. In addition, proxy 102 keeps track of the data of Flow 1 sent to proxy 103, including indicating via direction field 304 in each entry associated with Flow 1 in chunk index 301 and caching the entire Flow 1 in stream store 107. Similarly, proxy 103 performs the similar operations as those described with respect to FIG. 1A. However, in addition, proxy 103 maintains chunk index 302 for the data received from proxy 102 including the direction specified in direction field 303.

Referring now to FIG. 3B, assuming subsequently proxy 103 receives Flow 2 from its client, node 104 or another node. Proxy 103 performs the chunking, lookup, and caching operations as described above. Now proxy 103 operates as a sender and it uses the same chunk algorithm to chunk Flow 2 and uses the same hashing algorithm to generate fingerprints of the chunks. In this example, it is assumed that Flow2 [199:0] includes a first portion Flow2 [185:0] that is duplicated as Flow 1 and the remaining portion Flow2 [199:186] is new. After proxy 103 performs the chunking and generation of fingerprints for the chunks, proxy 103 performs a lookup in chunk index 302. In this example, proxy 103 finds the entries in chunk index 302 for the chunks corresponding to Flow2 [185:0] portion, which are part of stream 5.

According to one embodiment, based on direction field 303, proxy 103 knows that the chunks associated with Flow2

[185:0] have been previously received as part of stream 5 (e.g., Flow1 [185:0]) from proxy 102, where proxy 102 is now the destination of Flow 2. Thus, proxy 103 can assume that proxy 102 still maintains a copy of the chunks corresponding to Flow1 [185:0]. As a result, proxy can send a DUP_DATA message to proxy 102 indicating that the data intended to send over is part of stream 5 that was previously received from proxy 102. In response to the DUP_DATA message, proxy 102 can identify and retrieve the duplicated data from its stream store 107 and deliver the data to its client. Note that proxy 102 may have flushed the cached data after sending stream 5 to proxy 103. In this situation, according to one embodiment, proxy 102 may request proxy 103 via an out-of-band TCP connection to resend the actual data of Flow2 [185:0].

Since both proxies 102 and 103 independently maintain chunk indexes 301 and 302 and each chunk index maintain the traffic direction (e.g., transmitted or received), each of proxies 102 and 103 can independently select a stream ID that is unique to that direction, even though both proxies 102 and 103 may come up with the same stream ID. Alternatively, both proxies 102 and 103 may communicate with each other to come up with a unique stream ID that is globally unique.

Figure 4A:
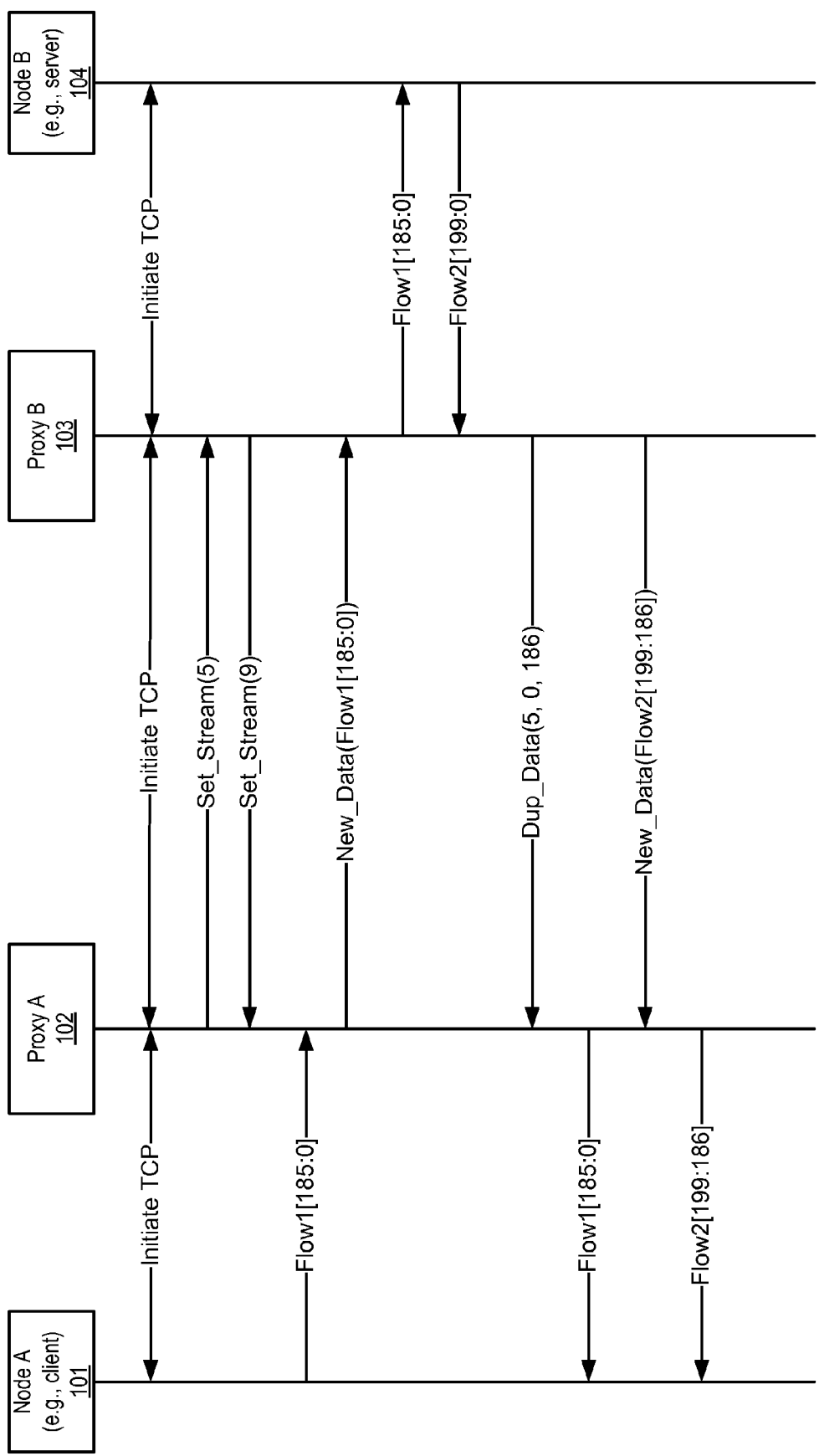
FIGS. 4A and 4B are transactional diagrams illustrating certain transactions of optimizing WAN traffic according to another embodiment of the invention.
Figure 4B:
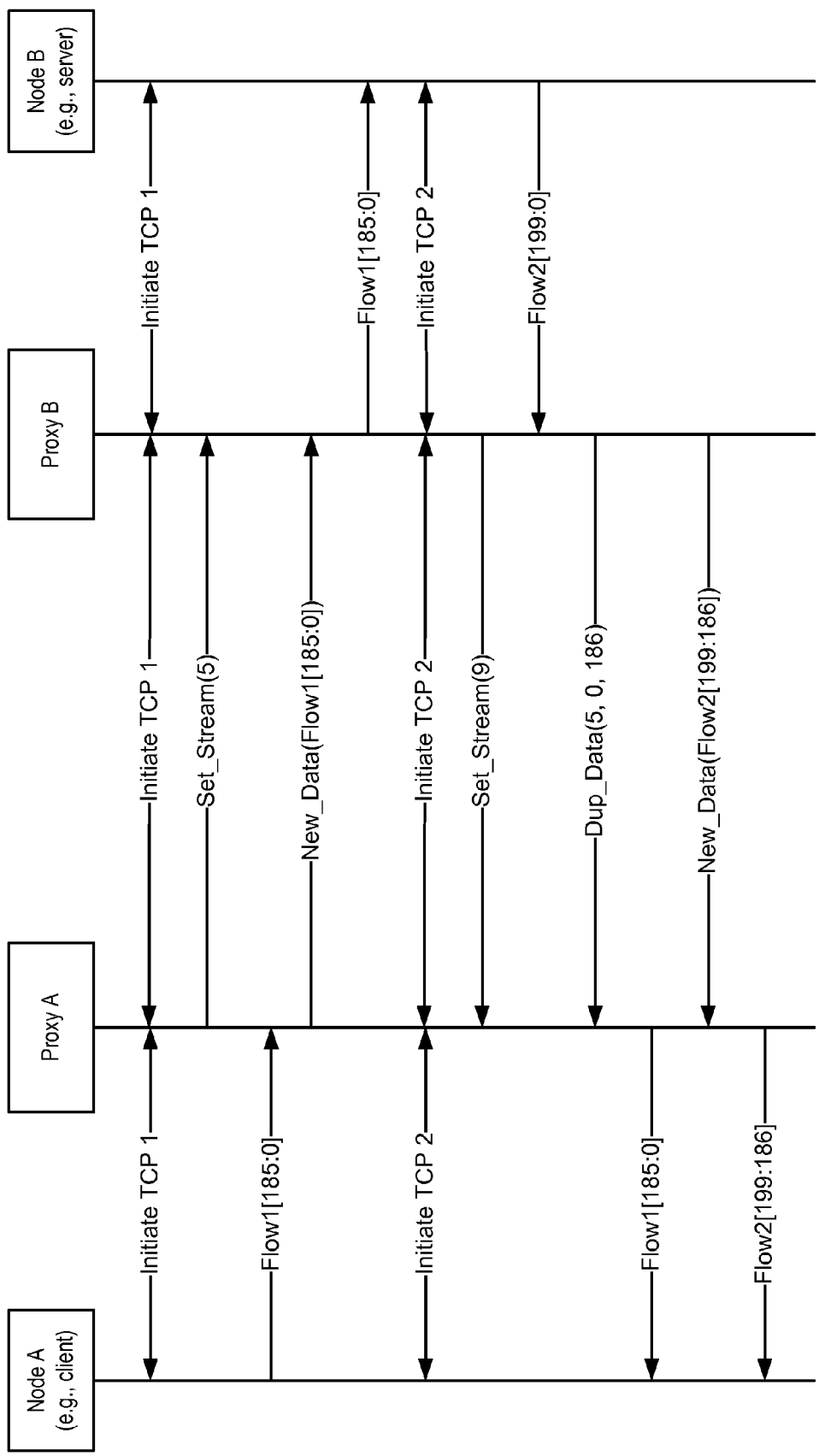

FIGS. 4A and 4B are transactional diagrams illustrating certain transactions of optimizing WAN traffic according to another embodiment of the invention. For example, FIGS. 4A and 4B illustrate at least some of the transactions performed with respect to FIGS. 3A and 3B. Referring to FIG. 4A, in this example, all transactions occur within the same TCP connection. Once proxies 102 and 103 have established the TCP connection, they independently select a stream ID for the transmission direction, steam ID of 5 for proxy 102 to send data to proxy 103 and stream ID of 7 for proxy 103 to send data to proxy 102. Note that they could select the same stream ID, but for different directions. FIG. 4B illustrates the transactions that occur in different TCP connections.

As described above, when a proxy receives a NEW_DATA message containing the new data from a client of the proxy or from a remote proxy, it performs chunking operations on the new data to generate new chunks. The proxy then indexes the chunks in its chunk index for future deduplication. According to one embodiment, instead of indexing every chunk of a flow, which may require a large chunk index data structure, an indexing scheme is employed to selectively index certain chunks of the flow to reduce a size of the chunk index. For example, chunks located at the beginning of a flow may be indexed more frequently than those located at the end of the flow. The rationale behind it is that data at the beginning of a flow (e.g., email headers) tends to change more frequently compared to the data located at the end of the flow (e.g., attachments) in view of the previously transmitted data.

In one embodiment, whether a particular chunk should be indexed is determined based on a pattern of certain bit(s) of its chunk ID (e.g., least significant bit(s) or LSB(s)). If the pattern of the predefined bit(s) matches a predetermined pattern, the corresponding chunk will be indexed in the chunk index; otherwise, it will not be indexed. According to another embodiment, whether a particular chunk should be indexed depends upon where that particular chunk is located within the flow. If a chunk is located towards to the beginning of the flow, it has a higher probability of being indexed. In one embodiment, if a hash value (e.g., a fingerprint) of a chunk equals to 0 MOD (MOD factor), where a modulus or MOD factor may wary dependent upon where the chunk is located within the flow. As a result, the size of the chunk index can be reduced.

Figure 5A:
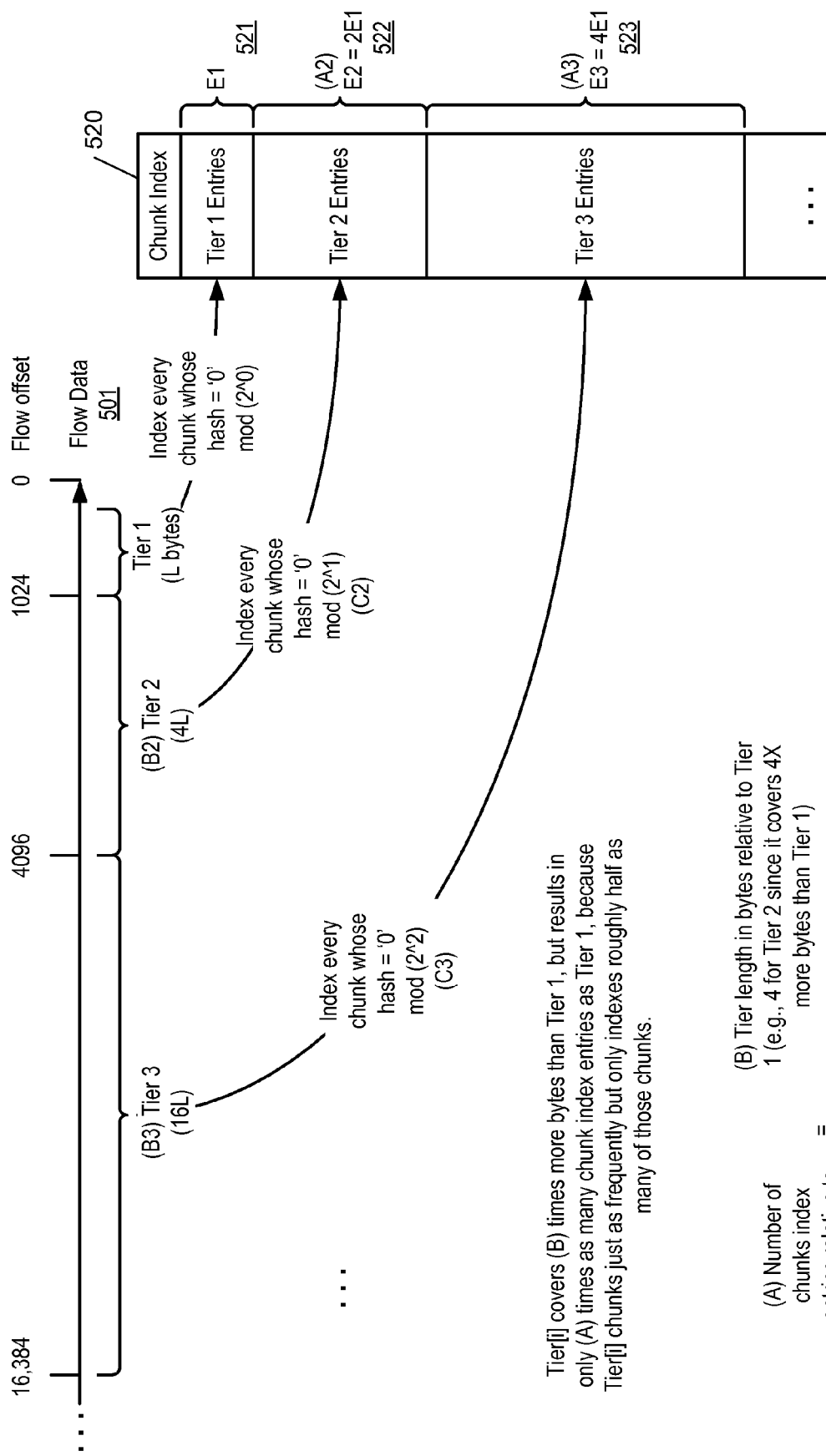
FIGS. 5A and 5B are block diagrams illustrating an indexing process according to certain embodiments of the invention.

FIG. 5A is a block diagram illustrating an indexing process according to one embodiment of the invention. Referring to FIG. 5A, when a proxy receive a flow of data 501 from a remote node, either a remote client or a remote proxy, the proxy chunks flow 501 into chunks using a predetermined chunking algorithm. For each of the chunks, the proxy further generates a hash or fingerprint for the chunk and attempts to index the chunk into chunk index 520 based on the hash of the chunk. In one embodiment, if a chunk is within a first region of the flow (e.g., based on a flow offset of the chunk), the proxy applies a selection predicate to determine whether to index the chunk. In one embodiment, a first mathematical operation (e.g., hash(chunk) MOD (first MOD factor)=0) is performed on a hash of the chunk. The result of the first mathematical operation is used to determine whether the chunk should be indexed in chunk index 520. If a chunk is within a second region of the flow (e.g., based on a flow offset of the chunk), a second mathematical operation (e.g., hash(chunk) MOD (second MOD factor)) is performed on a hash of the chunk. The result of the second mathematical operation is used to determine whether that chunk should be indexed in chunk index 520.

Referring back to FIG. 5A, flow 501 is partitioned into multiple tiers including tier 1, tier 2, ... tier N, etc., which may be partitioned using a variety of partitioning algorithms. In this example, a MOD operation is utilized as an example selection predicate with different MOD factors for different tiers. However, it is not so limited; other mathematical operations or formulas may also be utilized. In one embodiment, for the chunks within tier 1 (having 1024 bytes or 1 kilobytes (KB)), every chunk will be indexed in chunk index 520 as part of chunk index entries 521. For the chunks within tier 2 (having 4096 bytes or 4 KB), any chunk with a hash equal to (0 MOD (2^1)) will be indexed in chunk index 520 as part of chunk index entries 522. For the chunks within tier 3 (having 16,384 bytes or 16 KB), any chunk with a hash equal to (0 MOD (2^2)) will be indexed in chunk index 520 as part of chunk index entries 523, and so on. Note that the layout of chunk index 520 is shown for the purpose of illustration only. Entries of a particular tier may not be located next to each other. Entries of chunk index 520 may be sorted based on their hash values.

Note that the size of tier 2 is four times (4×) as of tier 1, while the size of tier 3 is 16× as of tier 1. However, the number of index entries of tier 2 is only twice as of tier 1, while the number of index entries of tier 3 is only 4× as of tier 1. According to one embodiment, a chunk will be indexed into chunk index 520 if any of the following are true:

The chunk begins in the first 1 KB of the flow.
The chunk begins in the first 4 KB of the flow, and the chunk's hash is equal to 0 MOD 2.
The chunk begins in the first 16 KB of the flow, and the chunk's hash is equal to 0 MOD 4.
The chunk begins in the first 64 KB of the flow, and the chunk's hash is equal to 0 MOD 8.
The chunk begins in the first 256 KB of the flow, and the chunk's hash is equal to 0 MOD 16.
The chunk's hash is equal to 0 MOD 32.

A flow may contain multiple data regions (e.g., files) defined by application-defined boundaries. According to one embodiment, the above tier structures may be defined in view of each of the data regions instead of the entire flow.

Figure 5B:
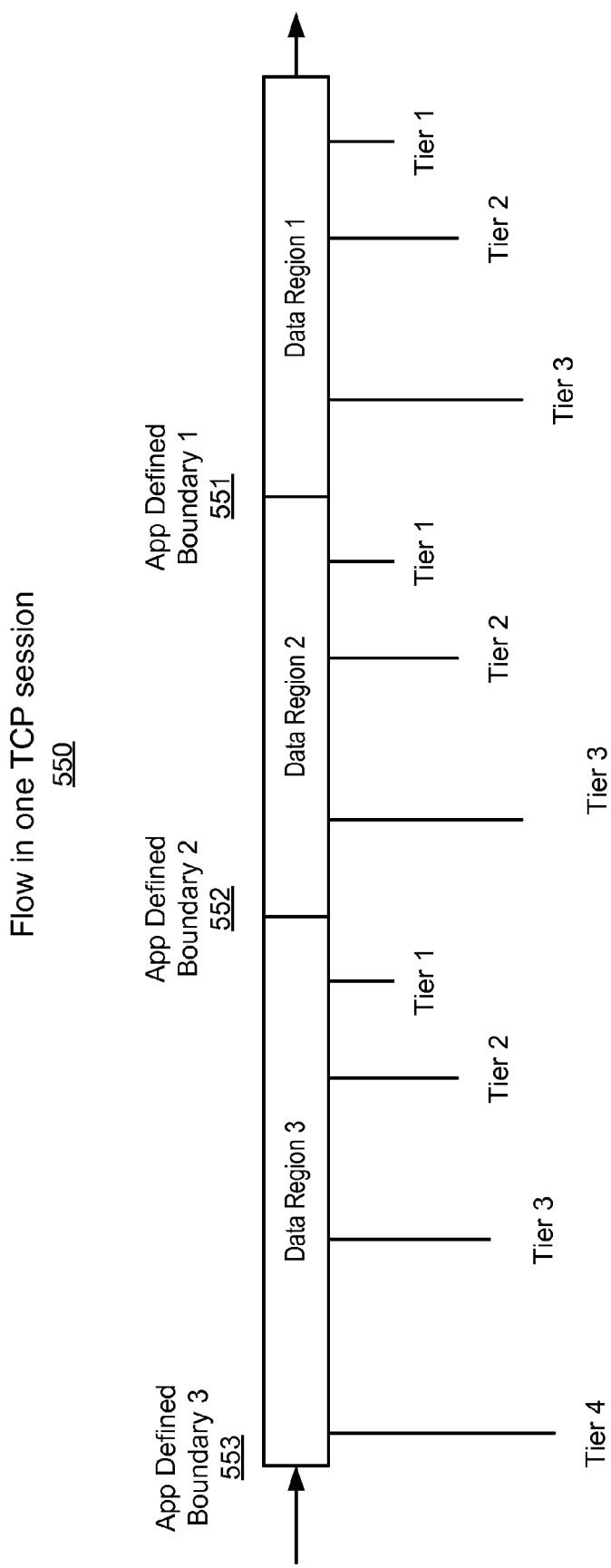

Referring now to FIG. 5B, in this example, flow 550 includes at least three regions, which may be defined by application specific boundaries 551-553, respectively. When chunking flow 550, a proxy may recognize the application-defined boundaries 551-553 and indexes the chunks in view of the application-defined boundaries 551-553. For the chunks in each of the regions, the above algorithms may be individually applied. That is, each region includes its own tier 1, tier 2, and so on. The indexing scheme as shown in FIG. 5B may be utilized in certain predefined protocols, such as hypertext transport protocol (HTTP), file transfer protocol (FTP), and session initiation protocol (SIP), etc. Note that the algorithm must be able to determine the boundaries between application regions in order to use this optimization.

Figure 6A:
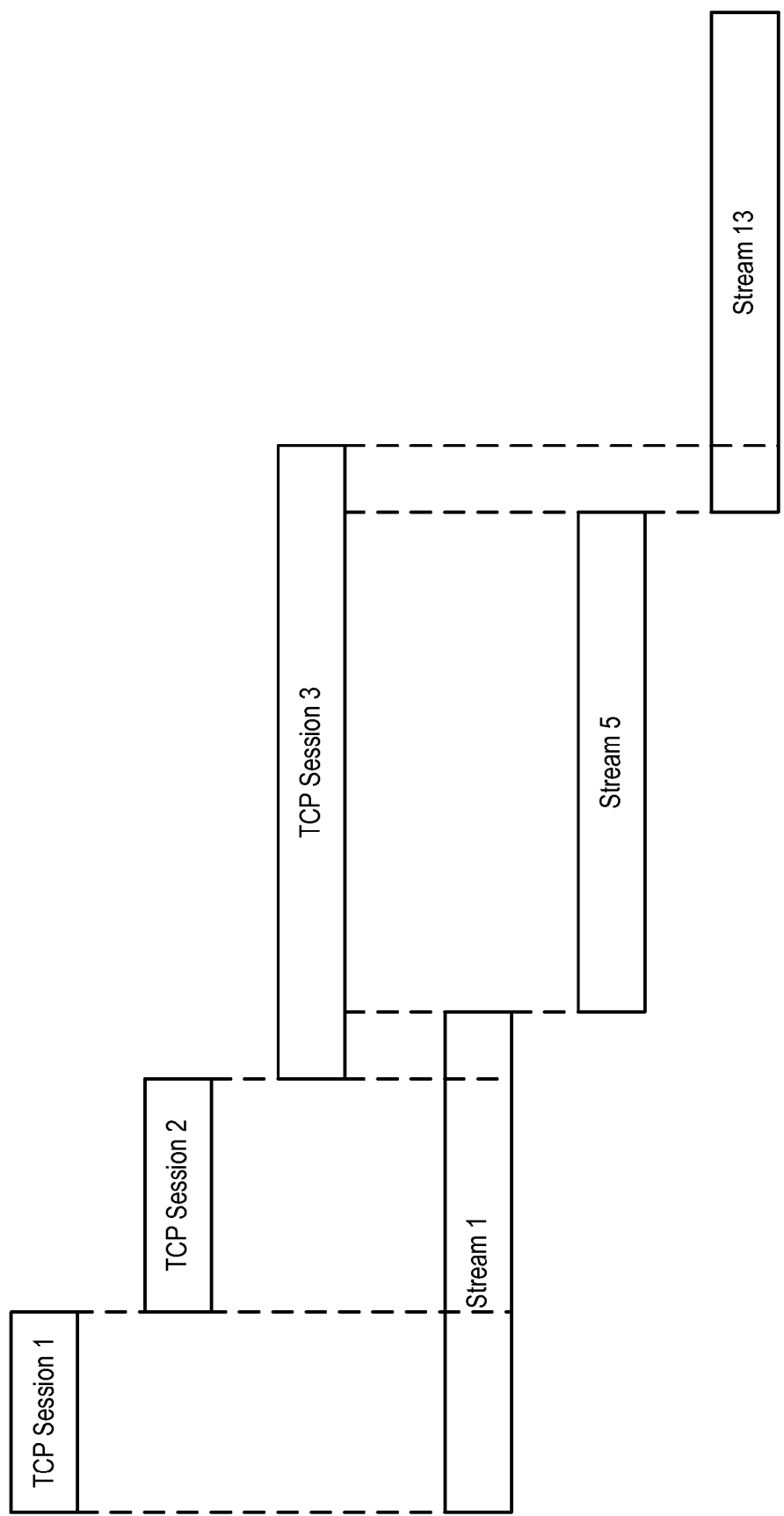
FIGS. 6A and 6B are block diagram illustrating relationships between streams and flows according to certain embodiments of the invention.
Figure 6B:
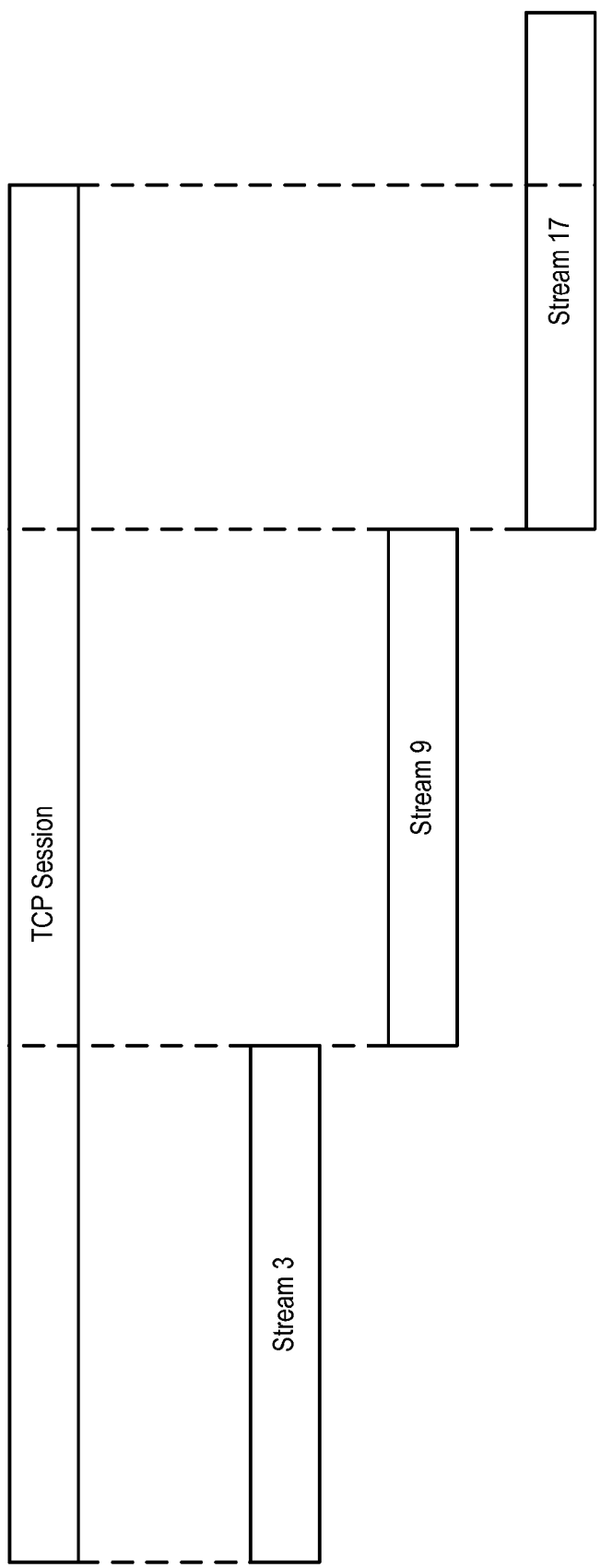

Also note that a stream of a predetermined stream size may be used to carry content of a TCP session as shown in FIG. 6A or alternatively, each TCP session may be transmitted via multiple streams as shown in FIG. 6B. The efficient indexing mechanism described herein can be applied to the configurations as shown in FIGS. 1A-1D and 3A-3B.

As described above, when a proxy receives a flow of data from a remote node, either being a client or a remote proxy, the local proxy caches the entire flow in a local storage (called stream store) in one or more streams, each being identified by a stream ID. In some situations, multiple flows received by the proxy may contain overlapped or duplicated data (e.g., email attachments). As the number of flows containing duplicated data grows, the storage space required to cache such flows will increase dramatically.

According to one embodiment, instead of caching each of the entire flows transmitted to or received from a remote proxy, a deduplication scheme for storage is employed at a local proxy to reduce the storage space for caching the flows. In one embodiment, a stream store includes multiple stream objects and one or more transmitted data files (TDFs) (or received data files or RDFs if the data was received from a remote proxy, collectively referred to as data files). For the purpose of illustration, the operations will be described in view of a sender proxy; however, the techniques described herein can be applied to a receiver proxy.

According to one embodiment, the TDFs contain data or chunks that are not duplicated with respect to the cached streams or flows, where a flow may be associated with one or more streams and each stream is associated with a stream object. Each stream object includes one or more stream entries and each stream entry includes a pointer referencing at least a portion of the content stored in the TDFs. Those referenced data collectively represent a specific stream of data associated with the stream object. When multiple streams contain overlapped or duplicated data, each of the corresponding stream objects associated with those streams includes at least one stream entry referencing the same TDF(s). In one embodiment, each entry of a stream object includes a TDF ID identifying the corresponding TDF, a file offset where the corresponding segment starts, and a length of the segment of the TDF corresponds to the data segment associated with the stream entry. As a result, the storage space to cache the transmitted data can be reduced.

According to some embodiments, files store the actual bytes of data that were either sent or received by a proxy. Files are append-only and in a predetermined size (e.g., at most 512 KB). The proxy can add data to the end of a file, but it never removes or changes bytes within a file. Files are identified by their file IDs, which may be a 32-bit integer according to one embodiment. In such a configuration, a proxy can store $2^{32}*512$ KB total. In contrast to a file, a stream represents the actual stream of bytes sent from one end of a TCP flow to another, for example, the bytes sent from the client to the server. Any given stream represents a predetermined amount (e.g., 1 MB) of data transferred. The proxy thus stores the bytes of a long TCP flow in multiple streams. Concretely, a stream is a sequence of references into the files in which store the bytes of the flow. Each reference contains a file ID, an offset in the file, and a length, all of which may be represented as 32-bit integers. More than one stream may reference the same file.

In one embodiment, streams may be identified by a tuple of generation number, peer ID, direction, and ID. The proxy stores a generation number on its hard disk and changes it only when directed to completely clear its cache. A peer ID may be the Internet address of the proxy with which a stream is shared. On the client proxy of a particular flow, for example, the peer is the Internet address of the server proxy for that flow. The direction indicates whether the bytes in the stream were sent or received by the proxy storing that stream. In one embodiment, a stream ID is a 31-bit identifier unique to that particular generation, peer, and direction.

As described above, particular substrings of streams are referred to as chunks. A chunk index maps the hashes of these chunks to their locations in streams. In one embodiment, a chunk index is divided into buckets, each of which contains up to certain amount of entries (e.g., 42 entries). An entry is a tuple of certain low order bits (e.g., 16 bits) of a chunk's hash, a peer ID (e.g., 12 bits), a direction (e.g., 1 bit) and stream ID (e.g., 31 bits) relative to that peer, and an offset (e.g., 20 bits) within that stream. The peer ID is an index into a table of peers' Internet addresses; a proxy may thus have up to, for example, 4096 unique peers. According to one embodiment, a chunk index entry may optionally contain a pointer to the previous and next entries in a least recently used (LRU) list for the bucket, represented as an integer (e.g., 8-bit integer) index into the bucket. In addition, the proxy also maintains a list of locked streams and a list of locked files. The proxy may not delete a locked stream or file. It locks a stream if the stream is in use in deduplicating a current flow, as described below. It locks a file if it has locked any stream that references that file. According to one embodiment, a proxy allocates a certain amount of space for each category: transmitted data files (TDFs), streams, and the chunk index. Occasionally it may run out of space in one or more categories, and when that happens, the proxy deletes some TDFs, streams, or chunk index entries as needed to free some space up, and the proxy does that in an LRU order, which it maintains on a per-category basis. Furthermore, the proxy is resilient to bad references. For example, if it follows a matching chunk fingerprint to a stream to a TDF that no longer exists, the proxy considers that fingerprint a non-match, and it stays in the new data or initial state. Alternatively, if the proxy receives a stream ID from the remote proxy that it no longer recognizes, the proxy just fetches the data it needs.

In one embodiment, when the server proxy (e.g., proxy 103) receives a SET_STREAM message, it makes note of the stream ID and offset, and it allocates a stream object for that stream ID if it does not have one already for the given peer. If the offset in the SET_STREAM message is greater than the length of the stream as it exists on the server proxy, the server proxy uses its out-of-band channel to send a STREAM_DATA_REQ to the client proxy. This message includes the current generation number for the server proxy, the generation number of the client proxy that the server proxy discovered in the SYNC_RESP during setup, the stream ID, the current length of the stream on the server proxy, and the difference between that length and the offset as specified in the SET_STREAM message.

In one embodiment, the client proxy (e.g., proxy 102) responds to the STREAM_DATA_REQ with a STREAM_DATA_RESP message, which contains the generation numbers, the stream ID, offset, and length from the request message, plus actual bytes from that portion of the stream. On receipt of the STREAM_DATA_RESP, the server proxy adds the new data to a file and adds a reference to the file to its stream object. At this point, the stream is synchronized between the two proxies, and the server proxy resumes processing subsequent messages from the flow. As the flow continues, the client proxy may exhaust the space available in the current stream, at which point it will select a new stream id and send a new SET_STREAM message. The server proxy handles these new messages in the same way as the initial one.

For each NEW_DATA message, the server proxy writes the data in the message into a file and adds a reference to that file to the current stream object. It also writes the data to the server. For each DUP_DATA message, the server proxy looks up the referenced stream to discover which files store the bytes covered by the given offset and length. It then reads the data from those files and writes it to the server. It also adds the appropriate references to the current stream object, such that the current stream points to the same data. Note that because it adds only references to the existing files, the server proxy deduplicates the received data within its storage layer (in the same way that the client proxy deduplicates its own storage on the sending side).

If the server proxy does not have a stream corresponding to the stream ID in a DUP_DATA message, it again uses the out-of-band channel to retrieve the missing data. However, it does not fetch the missing data using the stream ID of the previous stream referenced in the DUP_DATA message, but rather by using the stream ID of the current flow. That is, it sends a STREAM_DATA_REQ with the current stream ID, the current offset in the current stream, and the length in the DUP_DATA message. In this way, the server proxy fetches only the data it actually needs to reconstruct the current flow. It stores the returned data in a file and adds the appropriate references to the stream object.

As discussed above, when the server proxy receives a DUP_DATA message, it usually stores only new references to existing files, and thereby deduplicates its storage in the process. Because of the work already performed by the client proxy, the server proxy does not need to chunk or hash the data received in order to deduplicate its storage; it simply utilizes the deduplication already done on the client proxy.

The algorithm, however, is symmetric: the server proxy acts as the sending proxy for data transmitted from the server to the client. As such, it does its own deduplication for data in that direction. Moreover, it is commonly the case that the client will echo back to the server the data that the server sends to it—for example, when a user downloads a file from a file server, modifies it, and saves the result. An ideal protocol will identify the saved data as already having been transmitted over the network and deduplicate the transfer.

The protocol described above meets this goal by having the receiving proxy chunk, hash, and index the data it receives. Specifically, when the server proxy receives a NEW_DATA message, it chunks it, hashes the resulting chunks, and indexes the chunks according to the same restrictions used by the sending proxy (every chunk below 1 KB, every other below 4 KB, etc.). If the server later sends the same data back to the client, the server proxy (now acting as the sending proxy) will identify the duplicate data using the chunk index, and deduplicate it as described above.

Figure 7A:
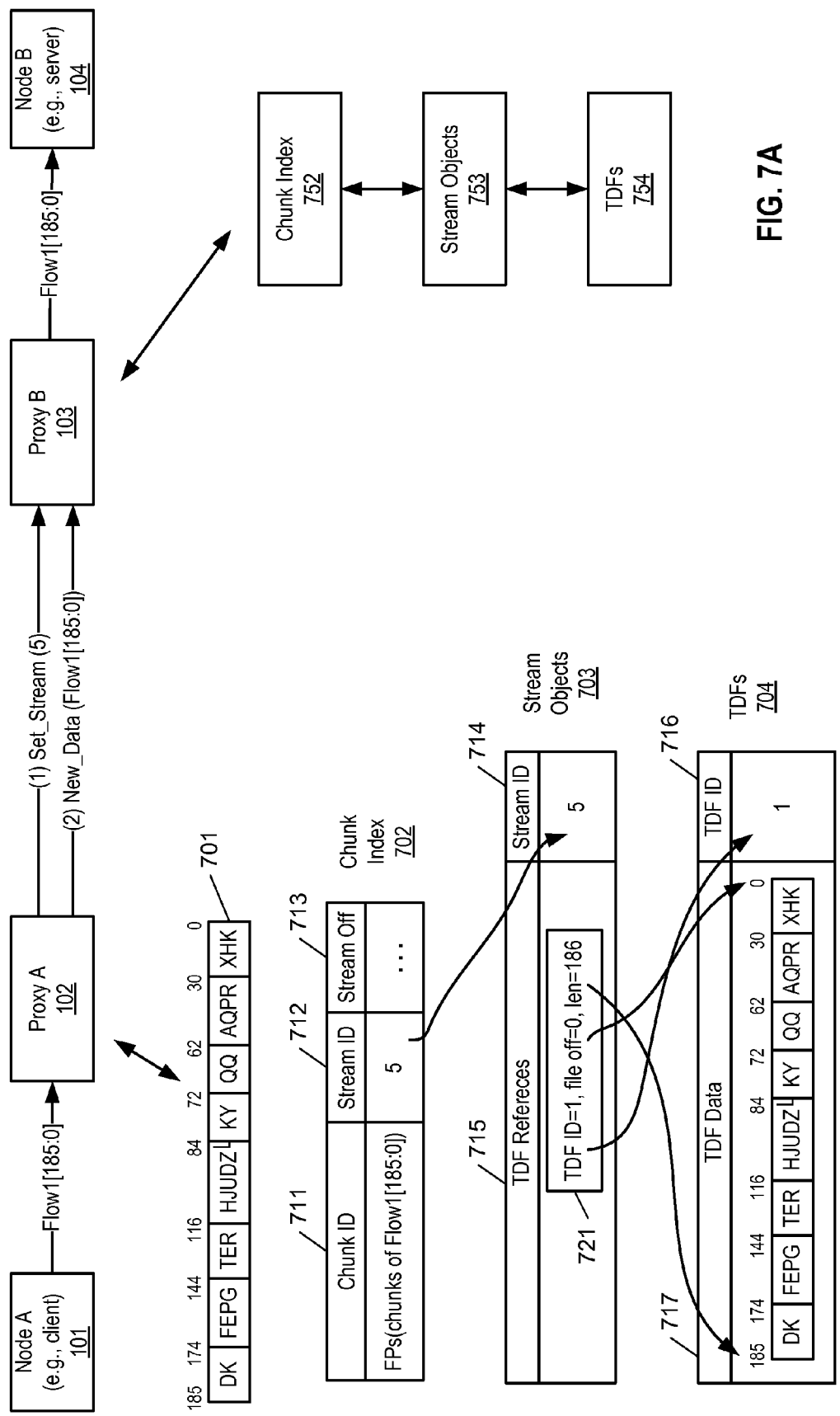
FIGS. 7A-7D are block diagrams illustrating a process of WAN traffic deduplication according to another embodiment of the invention.

FIGS. 7A-7D are block diagrams illustrating a system for optimizing WAN traffic with deduplicated storage according to certain embodiments of the invention. Referring to FIG. 7A, similar to the configuration as shown in FIGS. 1A-1D, proxy 102 maintains a chunk index 702 that indexes the chunks of a flow received from a client such as node 101 using a predetermined chunking algorithm and hashing algorithm as described above. In addition, proxy 102 maintains one or more stream objects 703, each representing a stream that is part of the flow transmitted to proxy 103, where the actual content of the stream is stored in one or more transmitted data files (TDFs) 704. Stream objects 703 and TDFs 704 collectively represent a stream store, similar to stream store 107 of FIGS. 1A-1D. Proxy 103 may optionally maintain the same or similar structures such as chunk index 752, stream objects 753, and TDFs 754.

According to one embodiment, when proxy 102 starts receiving Flow1, similar to the operations with respect to FIG. 1A, it buffers the data as buffered data 701 and allocates a new stream ID, in this example, stream ID of 5. Proxy 102 then chunks the data into chunks, generates fingerprints for the chunks, and performs a lookup and indexing operation in chunk index 702 to determine whether any of the chunks have been previously processed (e.g., indexed and cached) using the techniques as described above with respect to FIG. 1A. Chunks may be chunked and looked up using the efficient indexing scheme as described above, for example, with respect to FIGS. 5A and 5B. In one embodiment, for each new stream ID, a stream object, in this example, stream object 703 is allocated, where a stream object contains information referenced to a portion of a data file, such as TDF 704. In this example, since Flow1 is entirely new, Flow1 will be stored in TDF 704 and referenced by stream object 703, which has been allocated for stream 5. In this example, since the entire Flow1 has been cached in a single TDF, there is only one TDF reference 721 in stream object 703 which references to the entire TDF 704. In one embodiment, TDF reference 721 includes a file ID identifying the associated TDF file (e.g., TDF file ID 1), a file offset of the TDF file from which the entry starts, and a length of the associated data portion.

Note that if the size of a flow or a stream is larger than the size of a TDF file, another TDF file may be allocated. As a result, the corresponding stream object may contain multiple entries referencing different TDF files. Also note that, as data of a flow is arriving at proxy 102, proxy 102 keeps appending the newly received data at the end of a TDF file and populates the corresponding stream object, until the TDF file reaches a predetermined size, upon which a new TDF file may be allocated. Typically, a proxy will keep appending and/or adding new TDF files without deleting them, until it receives a command (e.g., during a synchronization between a local proxy and a remote proxy) to purge the TDF files. In one embodiment, the system deletes TDFs in only two scenarios. If its storage fills up, the proxy deletes them according to the LRU order to make space for new ones. Alternatively, the operator may tell the proxy to clear its cache, in which case it deletes all of its TDFs and changes its generation number.

Figure 7B:
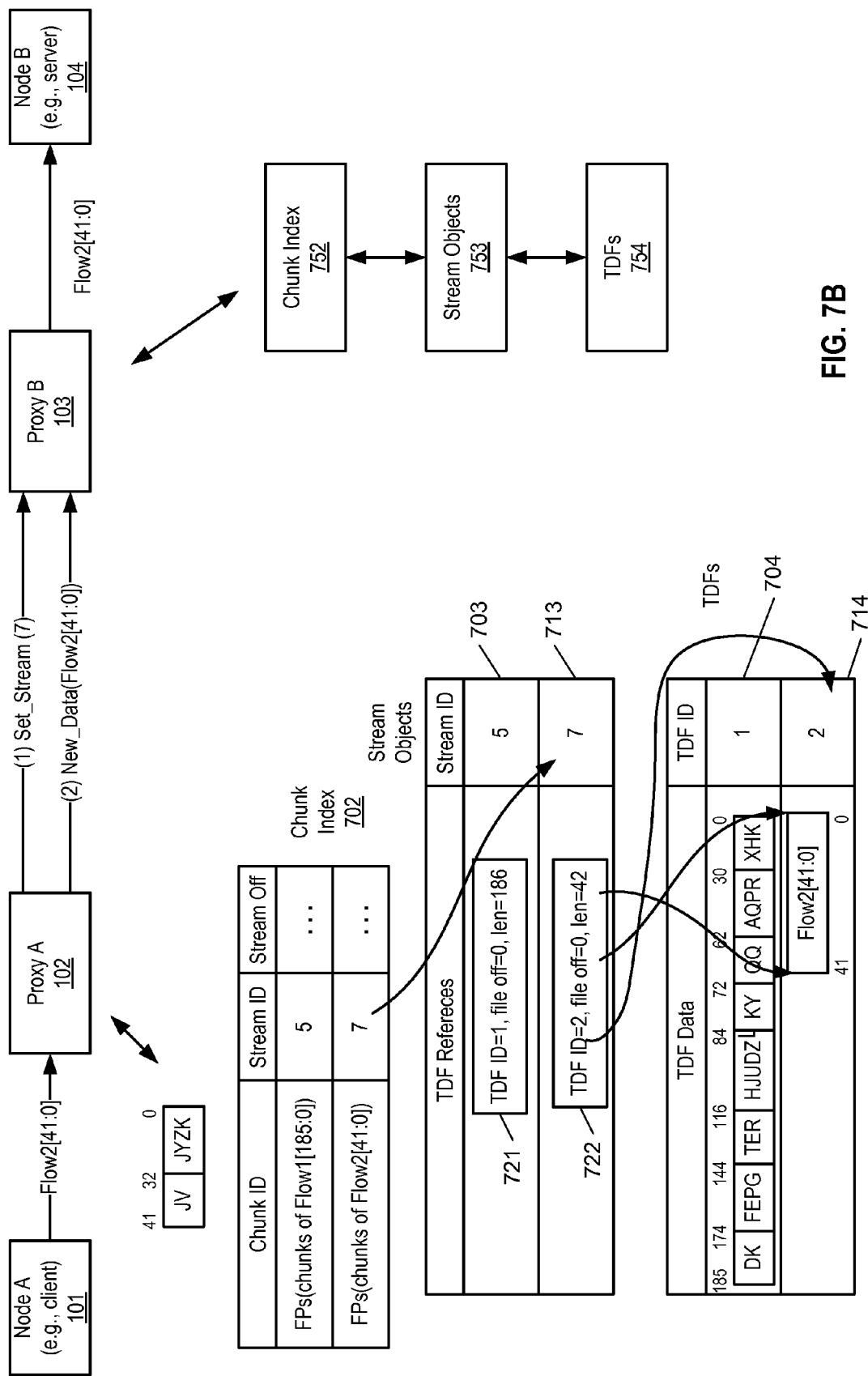

Referring to FIG. 7B, proxy 102 now starts receiving Flow 2, in this example, Flow2 [41:0], from its client, which may be node 101. Similar to proxy 102 of FIG. 1B, proxy 102 buffers the data and allocates a new stream ID, in this example, stream ID of 7. Proxy 102 then chunks the data into chunks, generates fingerprints for the chunks, and performs a lookup and indexing operation (e.g., using the efficient indexing scheme as described above) in chunk index 702 to determine whether any of the chunks have been previously processed (e.g., indexed and cached) using the techniques as described above with respect to FIG. 1B. In addition, a stream object 713 corresponding stream 7 is allocated. In this example, the chunks in Flow2 [41:0] are new and a TDF reference 722 corresponding to Flow2 [41:0] is added in stream object 713 and a new TDF file 714 is allocated to cache Flow2 [41:0]. As shown in FIG. 7B, TDF reference 722 includes information identifying TDF 714, a file offset of TDF 714 and a length of a data portion represented by stream entry 722.

Figure 7C:
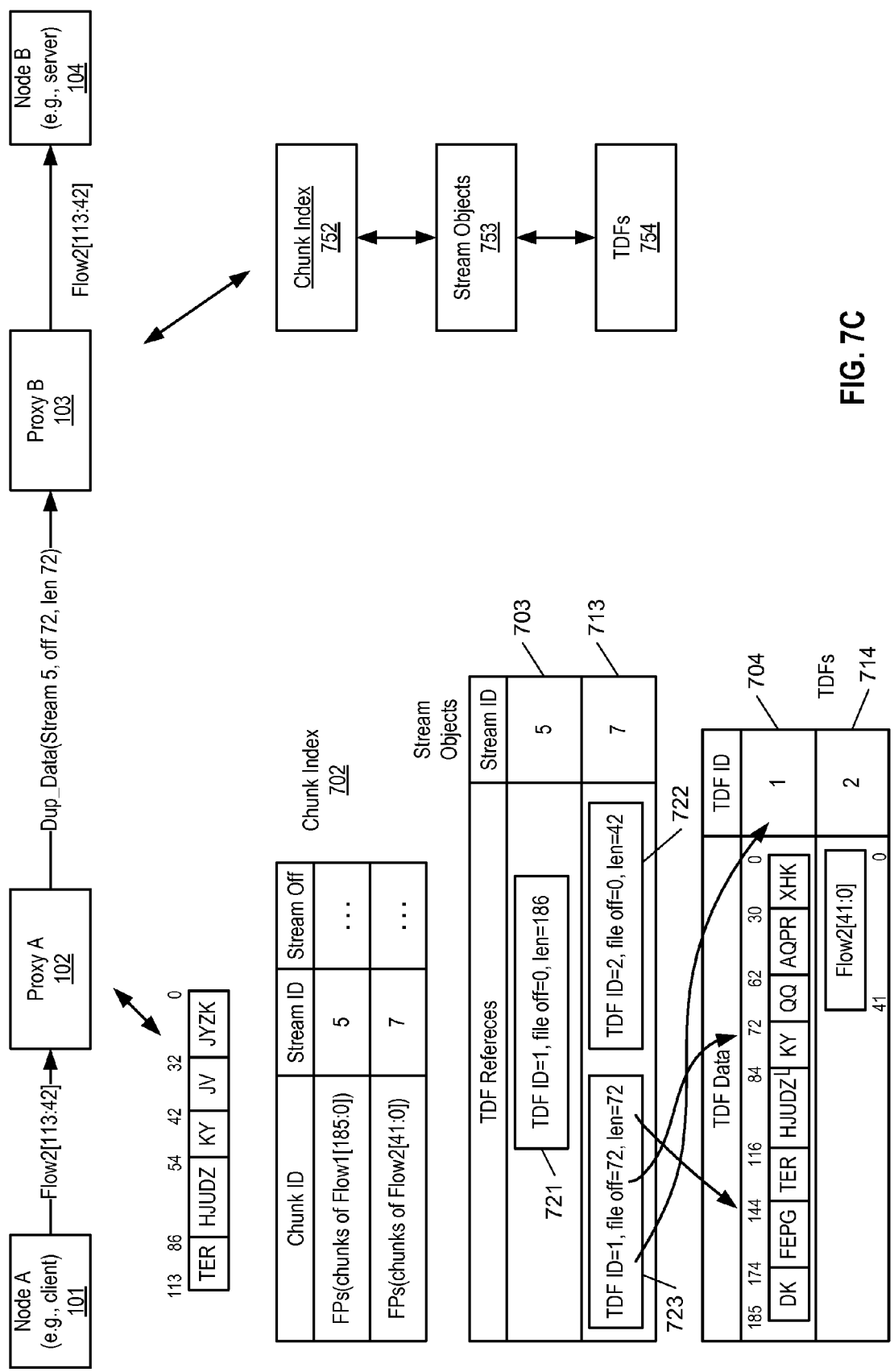

Referring to FIG. 7C, proxy 102 continues to receive Flow 2, in this example, Flow2 [113:42], from its client, which may be node 101. Similar to proxy 102 of FIG. 1C, proxy 102 chunks the data into chunks, generates fingerprints for the chunks, and performs a lookup and indexing operation (e.g., using the efficient indexing scheme as described above) in chunk index 702 to determine whether any of the chunks have been previously processed (e.g., indexed and cached) using the techniques as described above with respect to FIG. 1C. In this example, based on the lookup in chunk index 702, Flow2 [113:42] represents duplicated data that have been previously received as part of Flow1 [143:72] stored in TDF 704. As a result, there is no need to add another index entry in chunk index 702 and cache in TDF 714 for Flow2 [113:42]. Instead, according to one embodiment, a new stream entry 723 is added in stream object 713. As shown in FIG. 7C, TDF reference 723 includes information indicating that the corresponding data is stored in a particular location of TDF 704. In particular, TDF reference 723 includes information identifying TDF 704, offset, and length within TDF 704.

Figure 7D:
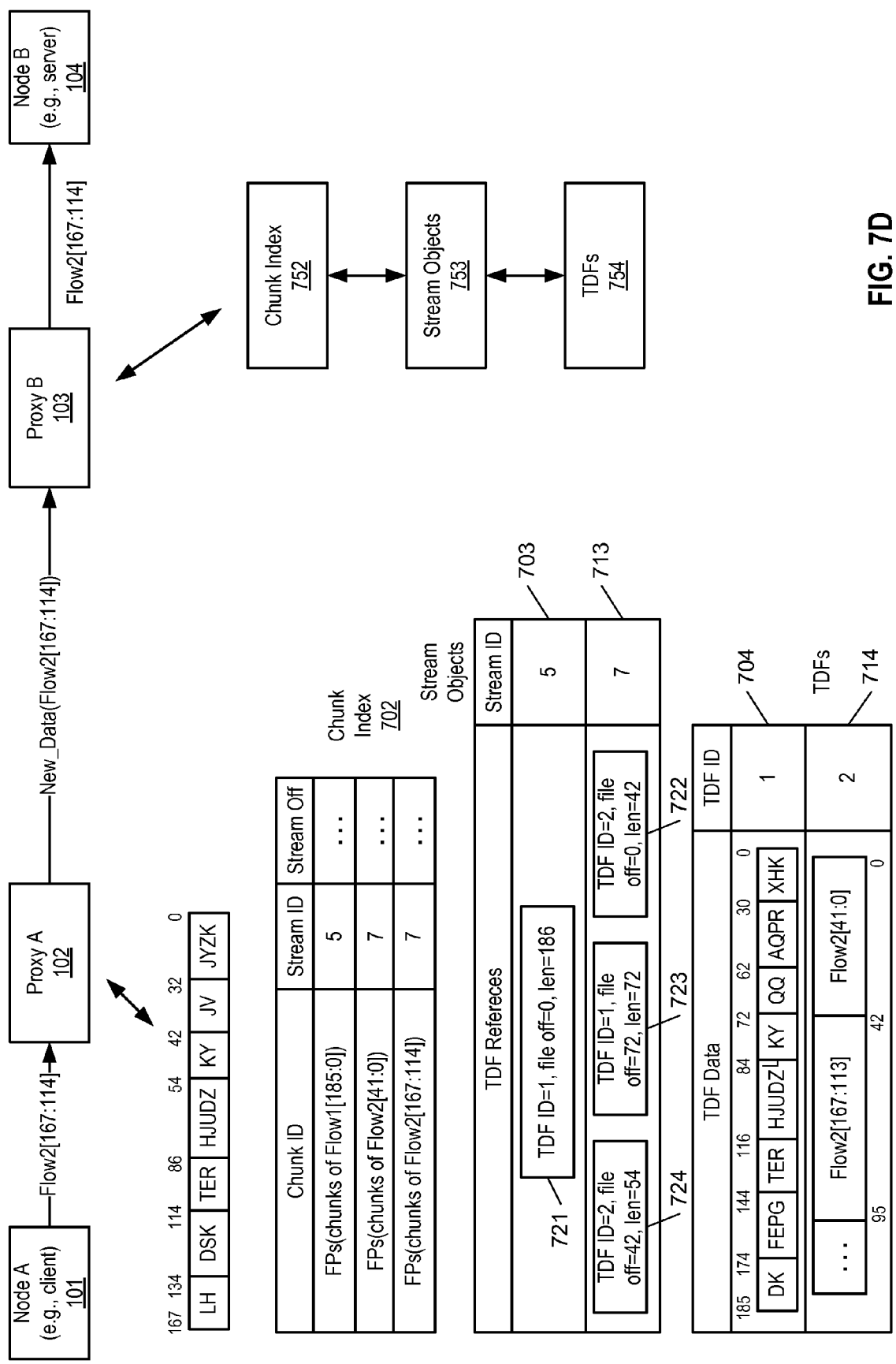

Referring to FIG. 7D, proxy 102 continues to receive Flow 2, in this example, Flow2 [167:114], from its client, which may be node 101. Similar to proxy 102 of FIG. 1D, proxy 102 chunks the data into chunks, generates fingerprints for the chunks, and performs a lookup and indexing operation (e.g., using the efficient indexing scheme as described above) in chunk index 702 to determine whether any of the chunks have been previously processed (e.g., indexed and cached) using the techniques as described above with respect to FIG. 1D. In this example, based on the lookup in chunk index 702, Flow2 [167:114] represents new data that has not been previously processed. As a result, Flow2 [167:114] is appended to the end of TDF 714. In addition, a new TDF reference 723 is added in stream object 713 referencing the newly appended portion in TDF 714 (e.g., TDF [95:42] of TDF 714). As a result, the storage space required by TDFs 704 and 714 is greatly reduced.

The techniques described above have been illustrated in view of a one-to-one proxy peer situation. However, more often a proxy may communicate with multiple remote proxy peers concurrently. As a result, a proxy has to keep track of which of the remote proxy peers with which it exchanges the data. In one embodiment, each stream object includes information identifying a remote peer with which the data corresponding to the TDF reference is exchanged. There are several scenarios in which a proxy has to maintain information identifying a particular one of multiple remote peers it communicates with.

Figure 8A:
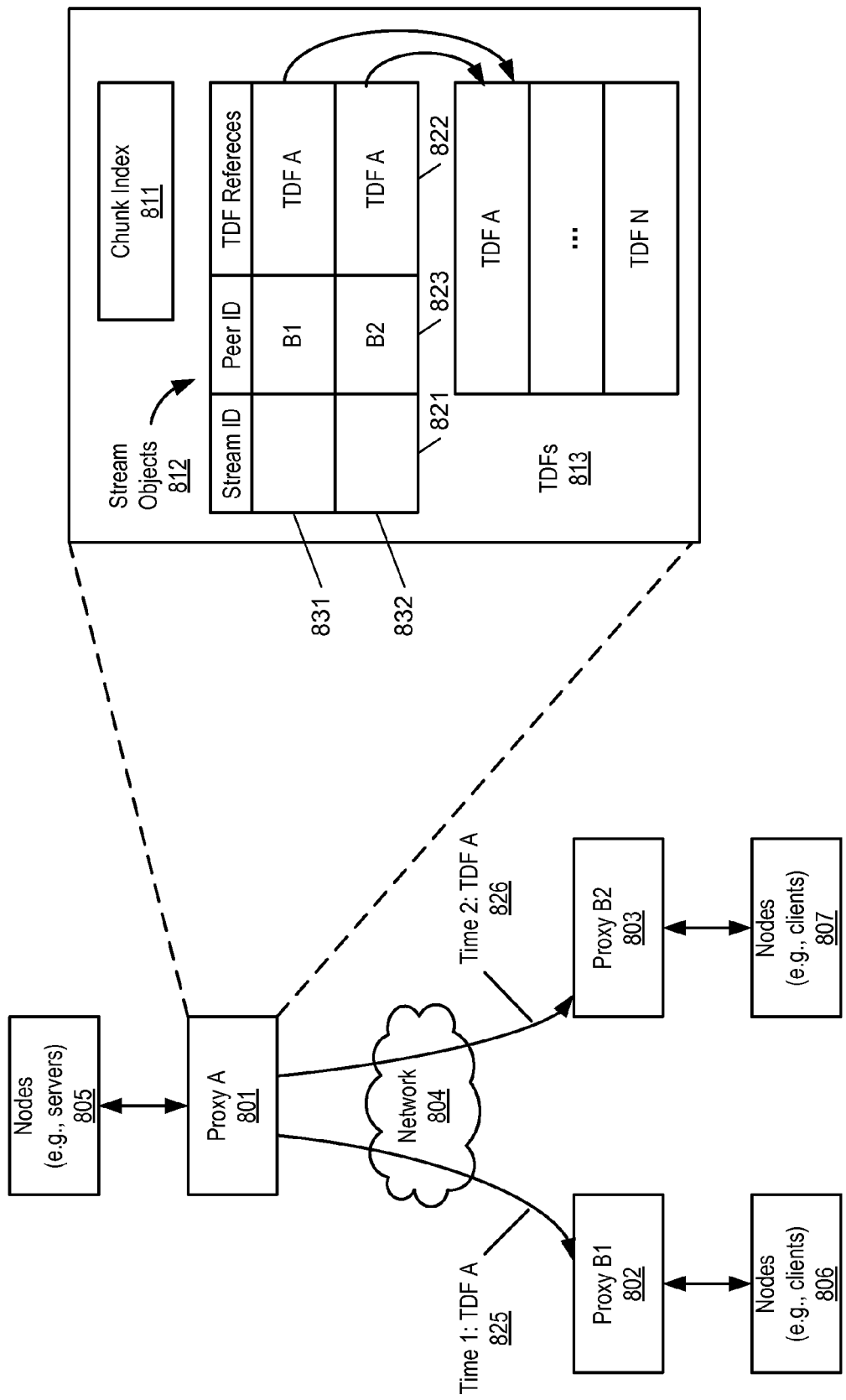
FIGS. 8A-8B are block diagrams illustrating a process of WAN traffic deduplication according to another embodiment of the invention.

FIG. 8A is a block diagram illustrating a configuration in which a proxy communicates with multiple remote proxy peers according to one embodiment of the invention. Referring to FIG. 8A, in this configuration, proxy 801 is communicatively coupled to proxies 802-803 over network 804, which may be a LAN, a WAN, or a combination thereof. Any of proxies 801-803 may communicate with more remote proxies concurrently. Proxies 801-803 perform proxy functionalities, including those described above, on behalf of their clients 805-807, respectively. Any of proxies 801-803 may be implemented as any of proxies 102-103 described above.

Figure 8B:
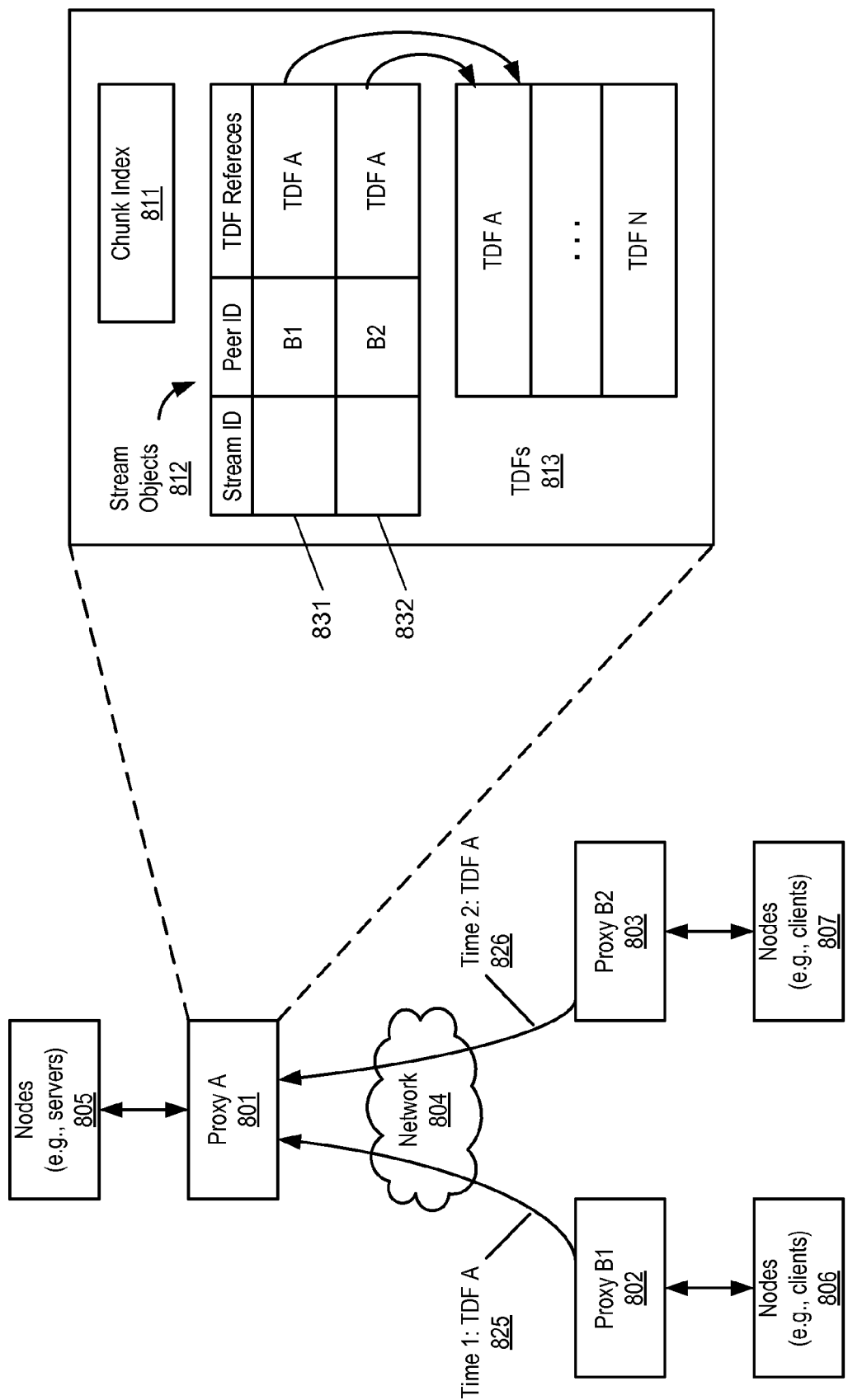

In communicating with proxies 802-803, proxy 801 maintains chunk index 811, one or more stream objects 812, and one or more TDFs 813. Chunk index 811, stream objects 802, and/or TDFs 803 may be implemented as any of the chunk indexes, stream objects, and TDFs described above. In addition to stream ID 821 and TDF references 822, according to one embodiment, each stream object further includes a peer ID 823 that identifies a remote proxy peer to or from which the corresponding data has been previously transmitted or received. Each of the stream objects 812 may further include a direction field identifying the direction of the associated data (e.g., transmitted to proxies 802-803 or received from proxies 802-803 as shown in FIG. 8B). Note that if any one of proxies 802-803 communicates with multiple remote proxy peers concurrently, it may also implement the same or similar data structures as of proxy 801.

In this scenario, it is assumed that proxy 801 sends data of TDF A to proxy 802 via path 825, and subsequently sends the same data of the TDF A to proxy 803 via path 826. When proxy 801 receives a stream of data from node 805 and transmits the data to any of proxies 802-803, proxy 801 populates stream objects 812 and TDFs 813 as described above, including populating peer ID field 823 and TDF references 822. In this example, the TDF references 822 of both stream objects 831-832 reference to the same TDF A. The techniques described in FIG. 8A may also be applied to the situation in which proxy 801 receives the same data from proxies 802-803 as shown in FIG. 8B.

Figure 9:
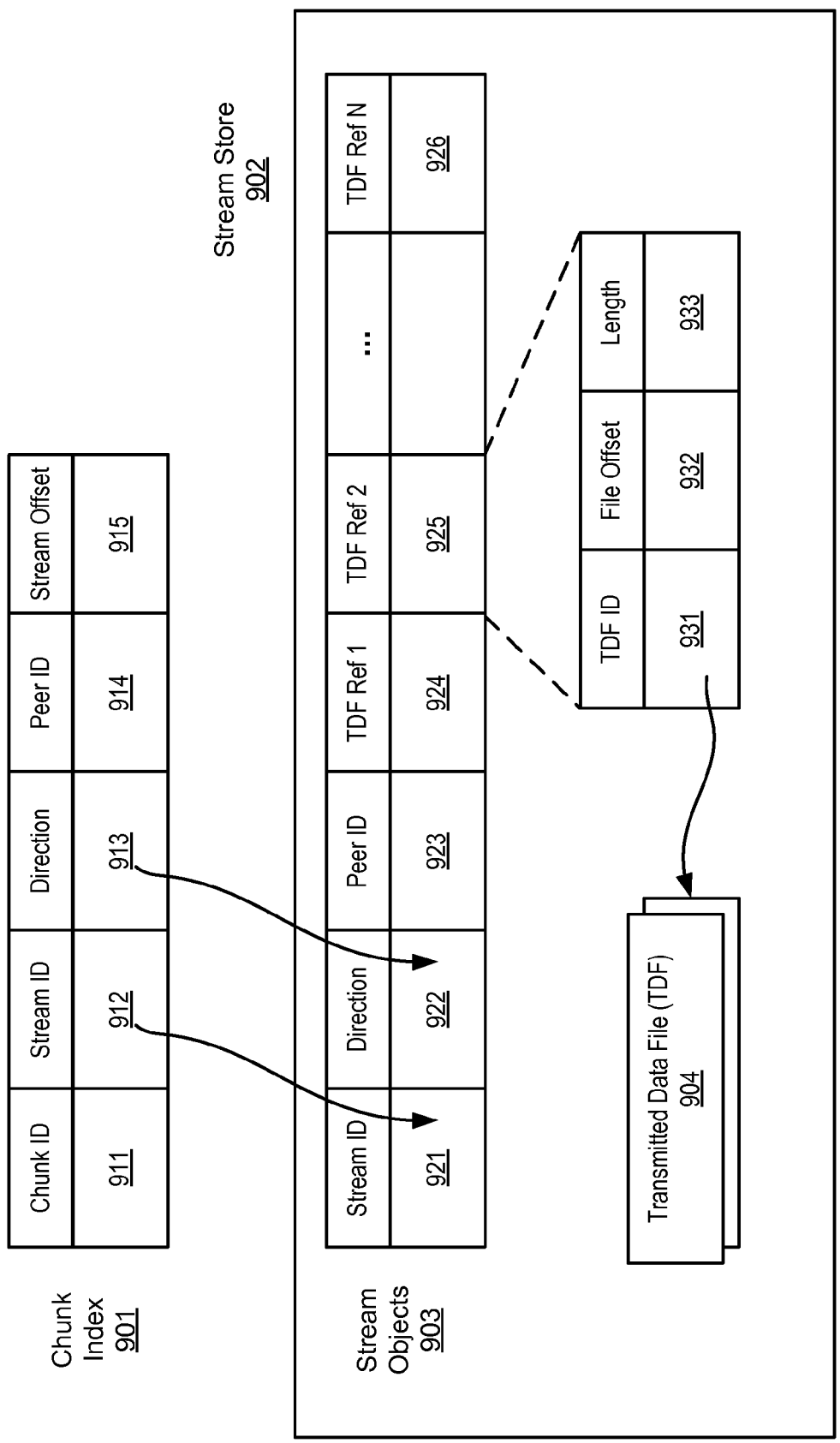
FIG. 9 is a block diagram illustrating a relationship between a chunk index and a stream store according to one embodiment of the invention.

FIG. 9 is a block diagram illustrating a relationship between a chunk index and a stream store according to one embodiment of the invention. Referring to FIG. 9, chunk index 901 and/or stream store 902 can be utilized to implement any of the chunk indexes and stream stores described above. In one embodiment, chunk index 901 includes one or more chunk index entries. Each chunk index entry includes chunk ID 911, stream ID 912, direction 913, peer ID 914, and stream offset 915. Chunk ID 911 represents a fingerprint of the corresponding chunk. Stream ID 913 specifies a stream in which the corresponding chunk is a member. Direction 913 specifies a direction of which the chunk is received or transmitted with respect to the local proxy. In one embodiment, stream ID 912 and direction 913 may be integrated as a single ID, where direction 913 may be one or more bits of stream ID 912. For example, direction 913 may be the most significant bit (MSB) of stream ID 912. Peer ID 914 specifies a remote proxy peer the chunk is transmitted to or received from a remote proxy that is identified by peer ID 914. Peer ID 914 may represent at least a portion of an IP address of the remote proxy peer. In one embodiment, peer ID 914 may be an index into a peer table (e.g., 12-bit peer ID). Stream offset 915 specifies where in the stream, which is identified by stream ID 912, the chunk is located.

In one embodiment, stream store 902 includes one or more stream objects referencing to one or more TDFs 904. Similar to a chunk index entry, each stream object includes stream ID 921, direction 922, and peer ID 923 to identify the associated stream, a direction of the stream, and which of the remote proxy peers initiates the stream. In addition, each stream object includes one or more TDF references 924-926, each referencing one of TDFs 904. In one embodiment, each TDF reference includes TDF ID 931 identifying one of the TDFs 904, file offset 932 identifying a location within the associated TDF file, and length 933 identifying the size of the stream segment. Note that not all fields as shown in FIG. 9 are required dependent upon the specific configurations described above.

Prior to the deduplication processes on a particular flow as described above, according to some embodiments, certain initialization processes have to be performed to synchronize between a local proxy and a remote proxy. In general, there are several phases of communication. If this is the first flow between these two proxies since the last time one of them rebooted, the client proxy (e.g., proxy 102) synchronizes its state with the server proxy. The client proxy chooses a stream ID and communicates that to the server proxy (e.g., proxy 103). The client proxy sends a stream of new and duplicate data messages to the server proxy. If it exhausts the space available in the current stream, the client proxy chooses another stream ID, communicates it to the server, and continues as before. If the client closes the read side or the write side of its TCP connection to the client proxy, the client proxy communicates this change to the server. If the client proxy receives such a message from the server proxy, it closes the read or write side of its connection to the client, respectively. When there is no more data left to read or write, and both the read and write sides of its connections to the client have been closed, the client proxy communicates to the server proxy that it is finished. When the client proxy is finished and it has received a message from the server proxy that the server proxy is also finished, the client proxy closes its TCP connection to the server proxy.

Figure 10:
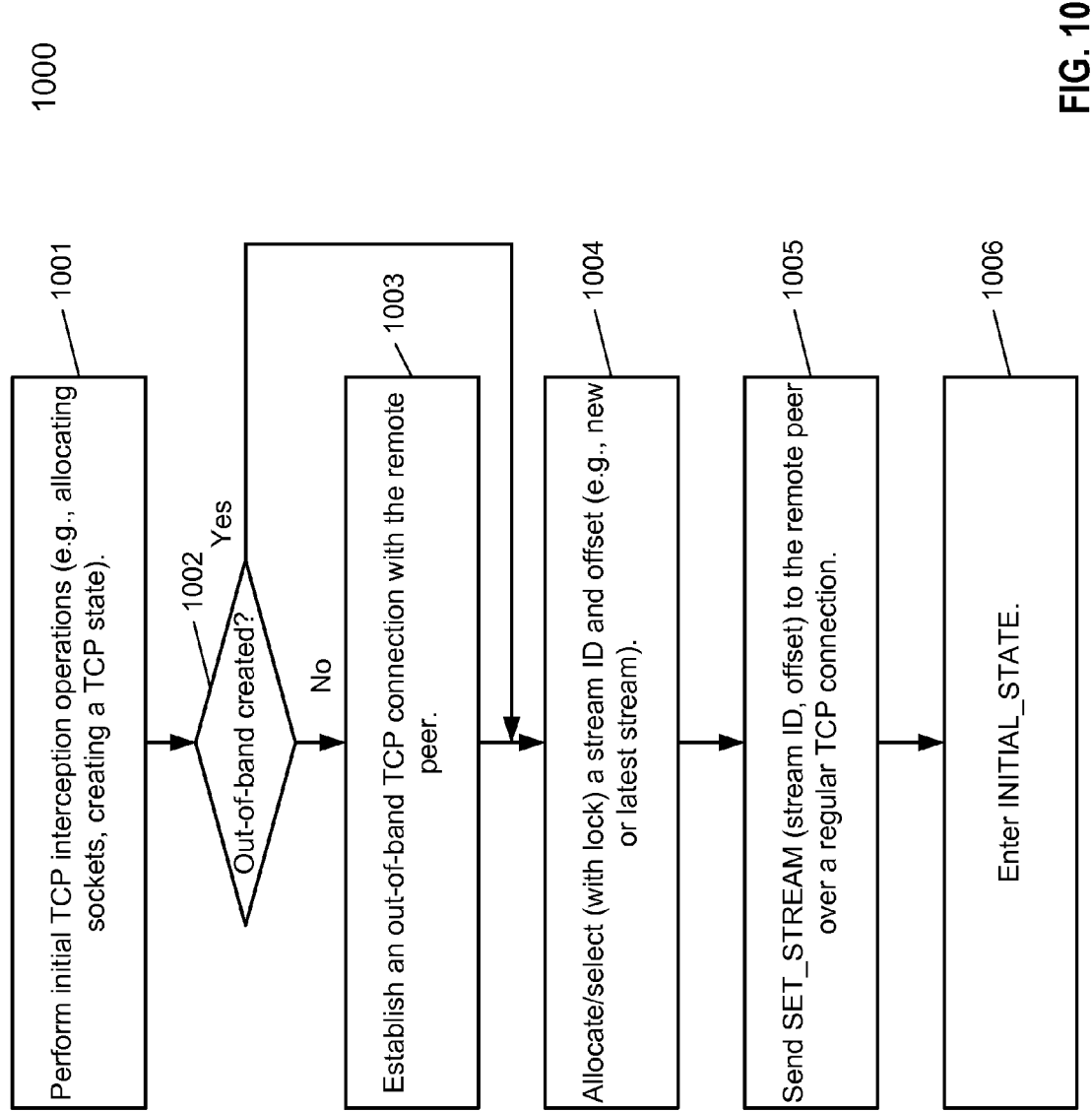
FIG. 10 is a flow diagram illustrating a method for initiation between proxy peers according one embodiment of the invention.

FIG. 10 is a flow diagram illustrating a method for initiation between proxy peers according one embodiment of the invention. Method 1000 may be performed by any of the proxies described above, which may be processing logic implemented in software, hardware, or a combination thereof. Referring to FIG. 10, when a proxy receives a request from a remote node, either a client or a remote proxy peer, a request to establish a TCP connection, at block 1001, processing logic performs any TCP initiation with its client and the associated remote proxy peer, such as setting up socket connections and maintaining TCP states associated with the connections, including handling SYN and SYN-ACK messages as described above. At block 1002, processing logic determines whether an out-of-band TCP connection with the remote proxy peer has been established. If not, at block 1003, processing logic establishes an out-of-band TCP connection with the remote proxy peer. The out-of-band TCP connection may be used to communicate between the proxy peers concerning certain abnormal situations, such as missing chunks that one proxy thought the remote proxy peer, but which the remote proxy peer no longer has. At block 1004, processing logic allocates or selects a stream ID and/or a stream offset associated with a stream identified by the stream ID. This stream ID may identify a stream that was communicated between a local proxy and a remote proxy before the communication was interrupted (e.g., cash or reboot) or a brand new stream, or it may reuse a stream ID from a previous flow if the addressable space in that stream is not yet exhausted. At block 1005, processing logic sends a SET_STREAM message including the stream ID and the stream offset to the remote proxy peer and enters an INITIAL state. Note that the remote proxy may perform the same or similar operations as described in FIG. 10. As a result, it may end up with two out-of-band TCP connections, one for each direction.

Figure 11:
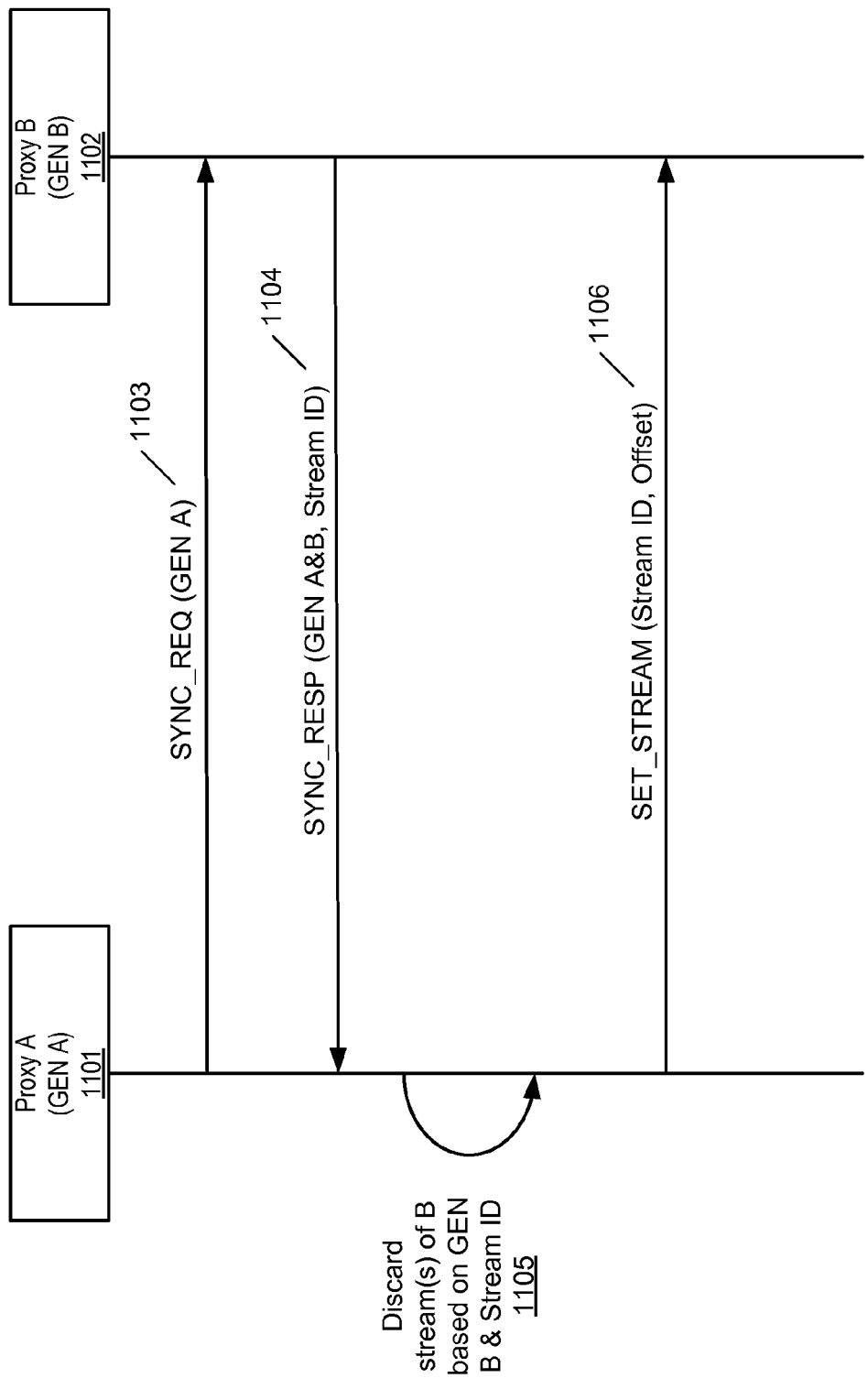
FIG. 11 is a transactional diagram illustrating an initialization process between two proxies according to one embodiment of the invention.

FIG. 11 is a transactional diagram illustrating an initialization process between two proxies according to one embodiment of the invention. As described above, client proxy 1101 and server proxy 1102 try at all times to maintain an out of band connection between them. This connection is a TCP connection independent of any of the flows they are deduplicating. When it first begins deduplicating a flow, client proxy 1101 checks whether it already has an out of band connection to server proxy 1102. If not, it opens a new one. Since the protocol is symmetric, server proxy 1102 will also attempt to create an out of band connection if it doesn't already have one. As such, the proxies may end up with two out of band flows between them, or they may end up with only one, dependent on the vagaries of timing. From the point of view of the protocol, it does not matter. Each proxy needs only some connection it can use.

Once an out of band connection is established, client proxy 1101 sends a SYNC_REQ message via transaction 1103, which contains the client proxy's generation. A generation represents a version of data a particular proxy is processing. The server proxy 1102 sends a SYNC_RESP message via transaction 1104, which echoes the client proxy's generation and includes the server proxy's generation and the largest stream ID the server proxy 1102 has sent for this peer (e.g., client proxy 1101) and generation. If client proxy 1101 has any streams for server proxy 1102 of a different generation, it discards them after receiving the SYNC_RESP message via transaction 1105. This procedure is an optimization to help client proxy 1101 quickly discard data that is no longer useful for deduplication in the case that server proxy 1102's disk has been cleared (e.g., because of an operator reset) since the last time the two proxies communicated.

Likewise, if client proxy 1101 has any received streams of the same server generation as in the SYNC_RESP message, but with IDs greater than the largest stream ID in the message, client proxy 1101 discards those as well. This protocol protects against the situation where server proxy 1102 rebooted before writing to disk a stream it sent to client proxy 1101. Without this protocol, client proxy 1101 might think a stream ID referred to data that server proxy 1102 had since forgotten, or worse, reused for different data. Conversely, this process means server proxy 1102 need not flush stream data to disk before transmitting it over the network, a consideration that is important for performance. Once client proxy 1101 has processed the SYNC_RESP message from server proxy 1102, the client proxy 1101 sends out a SET_STREAM message via transaction 1106. This message contains a stream ID and offset. If proxy 1101 has never used this stream ID before with server proxy 1102, the offset will be zero. Otherwise, it will be the next unused offset from the previous time.

Figure 13:
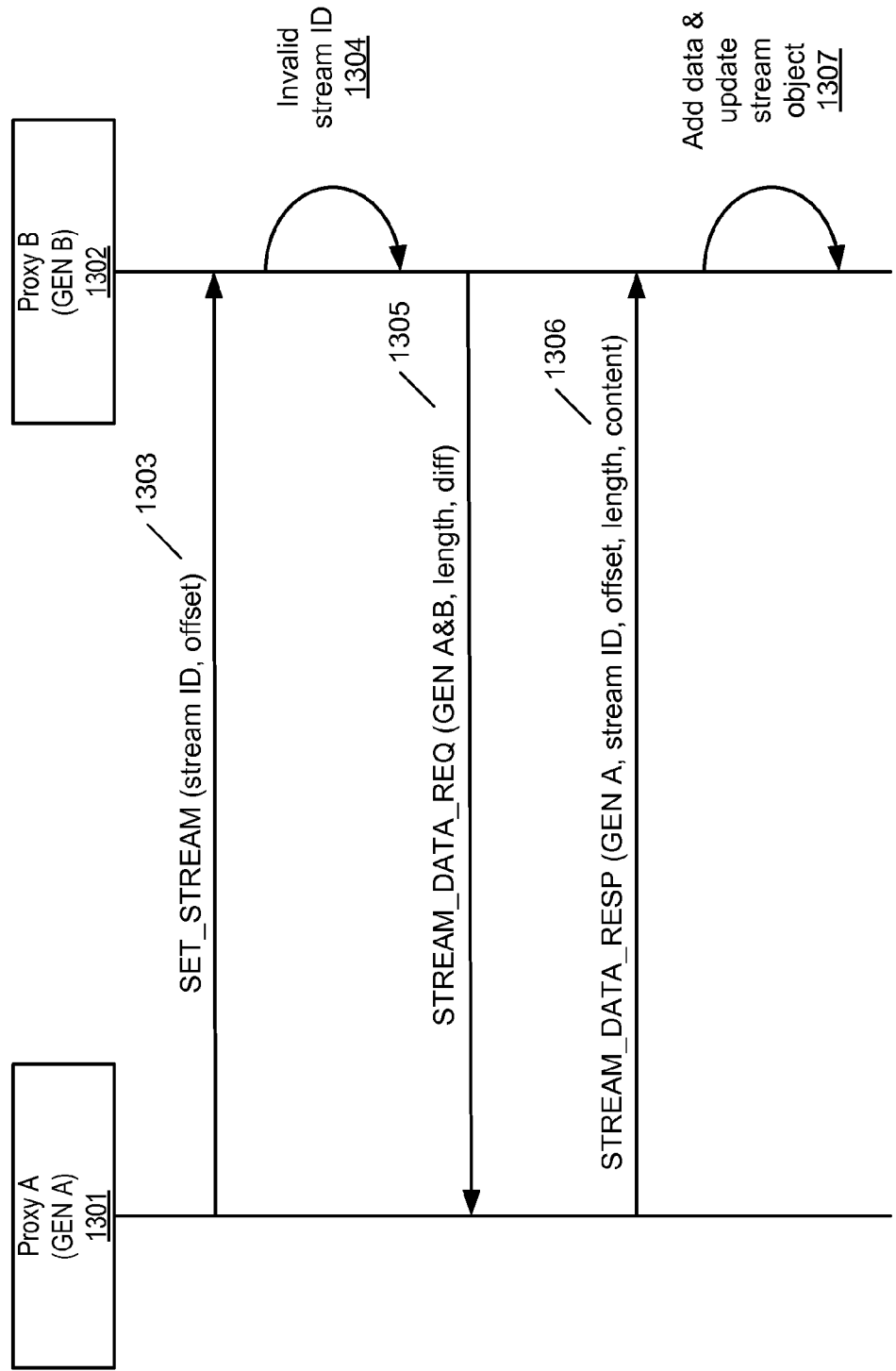
FIG. 13 is a transactional diagram illustrating synchronization between proxy peers according to another embodiment of the invention.

FIG. 13 is a transactional diagram illustrating synchronization between proxy peers according to another embodiment of the invention. Referring to FIG. 13, when proxy 1302 (e.g., server proxy) receives a SET_STREAM message from proxy 1301 (e.g., client proxy) via transaction 1303, proxy 1302 makes note of the stream ID and offset and allocates a stream object for that stream ID if it does not have one already for the given peer. If the offset in the SET_STREAM message is greater than the length of the stream as it exists on the server proxy via transaction 1304, the server proxy 1302 uses its out-of-band channel to send a STREAM_DATA_REQ to the client proxy 1301 via transaction 1305. This message includes the current generation number for the server proxy, the generation number of the client proxy that the server proxy discovered in the SYN- C_RESP during setup, the stream ID, the current length of the stream on the server proxy, and the difference between that length and the offset as specified in the SET_STREAM message.

The client proxy 1301 responds to the STREAM_DATA_REQ with a STREAM_DATA_RESP message via transaction 1306, which contains the generation numbers, the stream ID, offset, and length from the request message, plus actual bytes from that portion of the stream. On receipt of the STREAM_DATA_RESP, via transaction 1307, the server proxy adds the new data to a file and adds a reference to the file to its stream object. At this point, the stream is synchronized between the two proxies, and the server proxy 1302 resumes processing subsequent messages from the flow.

Figure 14:
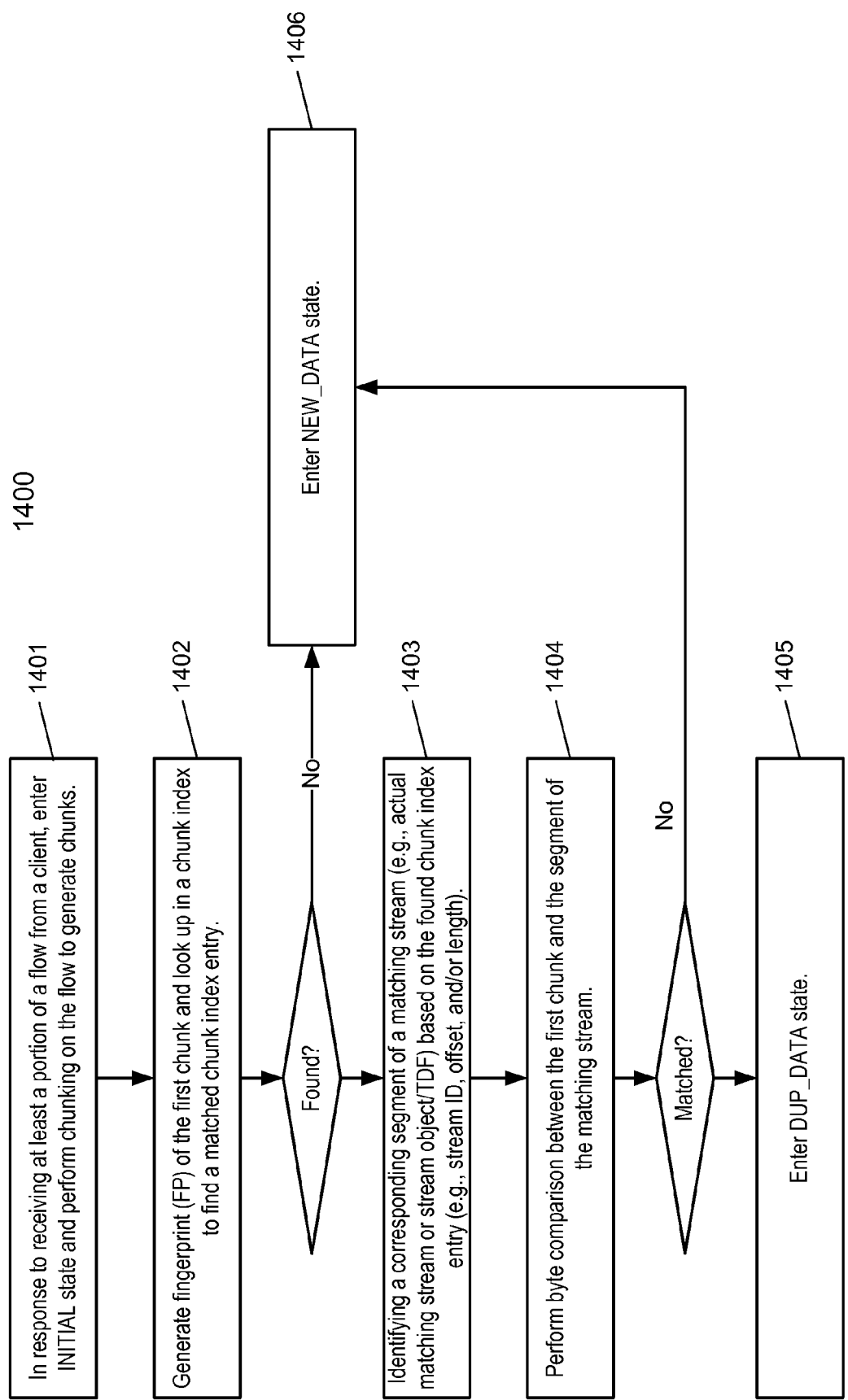
FIG. 14 is a flow diagram illustrating a method for optimizing WAN traffic according to one embodiment of the invention.

FIG. 14 is a flow diagram illustrating a method for optimizing WAN traffic according to one embodiment of the invention. Method 1400 may be performed by a proxy that transmits WAN traffic to a remote proxy as described above, which may be performed by processing logic implemented in software, hardware, and a combination thereof. Referring to FIG. 14, at block 1401, in response to receiving at least a portion of a flow from a client, processing logic enters an INITIAL state and performs chunking operations on the flow to generate chunks. At block 1402, processing logic generates a fingerprint for each of the chunks and looks up in a chunk index based on the fingerprints of the chunks to find a chunk index entry that matches the fingerprint of each chunk. If there is no matched chunk index entry, that means the received data is new data and thus processing logic enters a NEW_DATA state at block 1406. If a matched chunk index entry is found, processing logic identifies a corresponding segment of a matching stream (e.g., actual matching stream or stream object/TDF) based on the matched chunk index entry (e.g., stream ID, offset, and/or length). At block 1404, processing logic performs a byte-to-byte comparison between the first overall chunk and the segment of the matching stream to ensure that the chunk is actually matched (to avoid any hash collision). If they do not match, processing logic enters the NEW_DATA state at block 1406; otherwise, it enters a DUP_DATA state at block 1405.

FIGS. 15A and 15B are flow diagrams illustrating a method for optimizing WAN traffic according to another embodiment of the invention. Method 1500 may be performed by a proxy that transmits WAN traffic to a remote proxy as described above, which may be performed by processing logic implemented in software, hardware, and a combination thereof. Referring to FIG. 15, at block 1501, processing enters a DUP_DATA state. Processing logic may enter the DUP_DATA state based on the operations as shown in FIG. 14. At block 1502, processing logic receives a next input byte of a chunk as part of a flow received from a client, for example, from a buffer that buffers the received data. At block 1503, processing logic determines whether the input byte matches a next byte from the matching stream, which is tracked by matching stream offset maintained by the processing logic. It the current input byte does not match the next byte of the matching stream, it means that the input byte is new data. Thus at block 1504, processing logic sends a DUP_DATA representing the duplicated data that has been consumed or recorded thus far to a remote proxy, and updates the local chunk index, stream objects, and TDFs accordingly as described above. Thereafter, processing logic enters the NEW_DATA state at block 1505.

If the input byte matches the next byte of the matching stream at block 1503, it means that the input byte is still part of duplicated data. At block 1506, processing logic consumes or records the input byte as duplicated data and updates (e.g., increment) the offset of the flow and the offset of the matching stream. If the current stream is full at block 1507, processing logic sends DUP_DATA representing duplicated data that has been recorded thus far to the remote proxy, allocates a new stream with a new stream ID, and sends SET_STREAM with the new stream ID to the remote proxy at block 1510. If there is no more data in the buffer at block 1508, processing logic sends DUP_DATA representing duplicated data that has been recorded thus far to the remote proxy at block 1511. If the end of the flow has been reached at block 1509, processing logic sends DUP_DATA representing duplicated data that has been recorded thus far to the remote proxy at block 1512.

Referring now to FIG. 15B, processing logic enters a NEW_DATA state at block 1551, which may be based on the operations performed in FIGS. 14 and 15A. At block 1552, processing logic receives a next input chunk as part of a flow received from a client, for example, from a buffer that buffers the received data, and generates a fingerprint of the input chunk. At block 1553, processing logic looks up in the chunk index based on the fingerprint of the input chunk. If a matched chunk index entry is found, at block 1563, processing logic performs a byte-to-byte comparison between the input chunk and the cached chunk corresponding to the matched chunk index entry. If all of the bytes are matched, at block 1554, processing logic sends a NEW_DATA representing the new data that has been consumed or recorded thus far to a remote proxy, and updates the local chunk index, stream objects, and TDFs accordingly as described above. Thereafter, processing logic enters the DUP_DATA state at block 1555.

If there is no matched chunk index entry based on the lookup performed at block 1553 or not all bytes are matched at block 1563, it means that the input chunk is still part of the new data. At block 1556, processing logic consumes or records the input chunk as new data. If the current stream is full at block 1557, processing logic sends NEW_DATA representing the new data that has been recorded thus far to the remote proxy, allocates a new stream with a new stream ID, and sends SET_STREAM with the new stream ID to the remote proxy at block 1560. If there is no more data in the buffer at block 1558, processing logic sends NEW_DATA representing the new data that has been recorded thus far to the remote proxy at block 1561. If the end of the flow has been reached at block 1559, processing logic sends NEW_DATA representing the new data that has been recorded thus far to the remote proxy, allocates a new stream with a new stream ID at block 1562.

Figure 16:
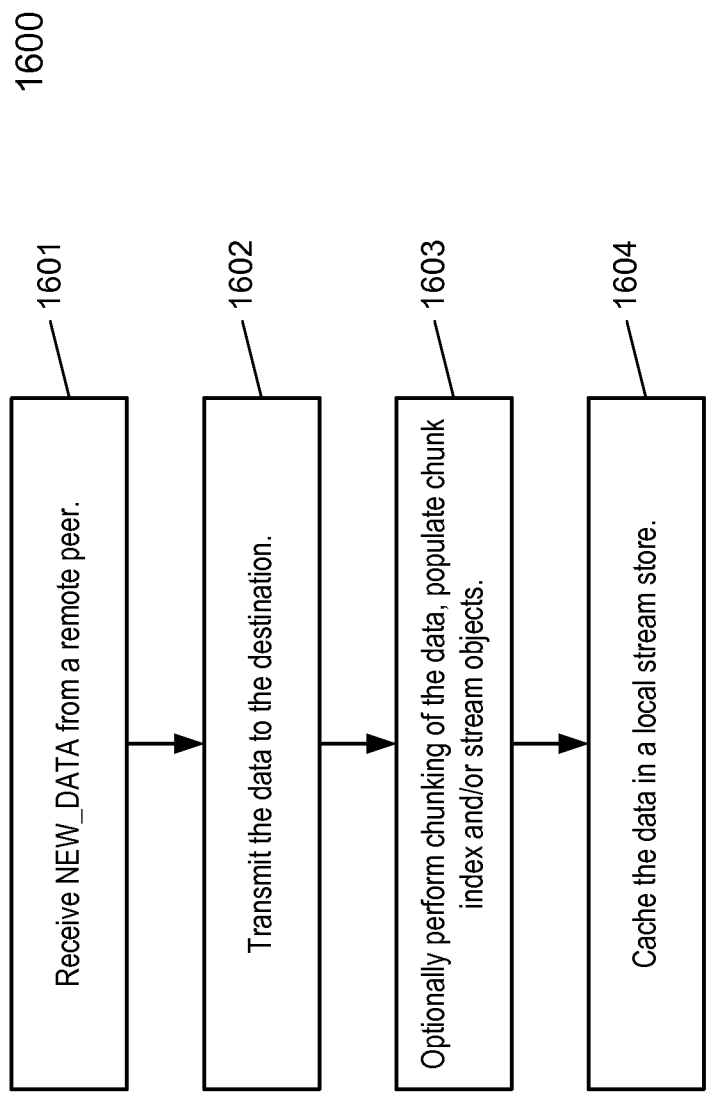
FIG. 16 is a flow diagram illustrating a method for optimizing WAN traffic according to another embodiment of the invention.

FIG. 16 is a flow diagram illustrating a method for optimizing WAN traffic according to another embodiment of the invention. Method 1600 may be performed by a proxy that receives data from a remote proxy peer as described above, which may be performed by processing logic implemented in software, hardware, and a combination thereof. Referring to FIG. 16, at block 1601, processing logic receives a NEW_DATA message from a remote proxy containing new data that has not been received previously from the remote proxy. At block 1602, the new data is transmitted to a client of the proxy. At block 1603, processing logic optionally performs chunking and indexing the new data. At block 1604, processing logic caches the new data in a local stream store.

Figure 17:
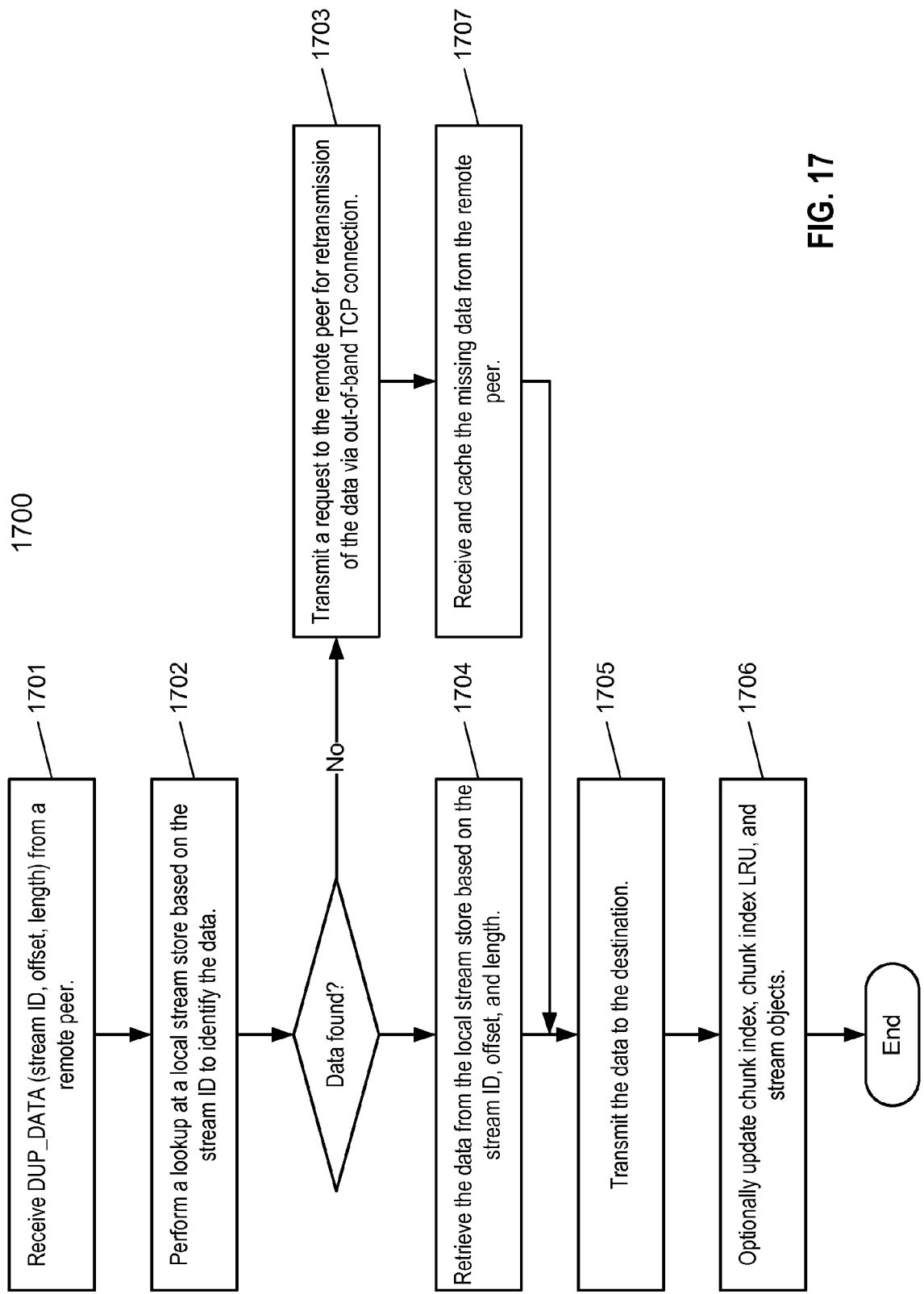
FIG. 17 is a flow diagram illustrating a method for optimizing WAN traffic according to another embodiment of the invention.

FIG. 17 is a flow diagram illustrating a method for optimizing WAN traffic according to another embodiment of the invention. Method 1700 may be performed by a proxy that receives data from a remote proxy peer as described above, which may be performed by processing logic implemented in software, hardware, and a combination thereof. Referring to FIG. 17, at block 1701, processing logic receives a DUP_DATA message from a remote proxy specifying data that has been previously received from the remote proxy. At block 1702, processing logic performs a look up at a local stream store to identify the data. If the specified data is not found in the local storage, at block 1703, processing logic sends a request via an out-of-band connection to the remote proxy for retransmission of the data. Once the missing data has been received from the remote peer, at block 1707, processing logic caches the missing data in a local stream store. If the data is found in the local stream store, at block 1704, processing logic retrieve the data from the local stream store and sends it to the destination at block 1705. At block 1706, processing logic optionally updates the chunk index, chunk index's LRU, and stream objects accordingly.

Thus, techniques for optimizing WAN traffic have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method comprising:
    caching, in a local stream store of a local proxy, one or more streams of data transmitted over a wide area network to a remote proxy, wherein each of the one or more streams is stored in a continuous manner and identified by a respective unique stream identifier (ID);
    comparing a flow of data received from a device with the one or more streams cached in the local stream store to determine whether at least a portion of the flow has been previously transmitted to the remote proxy via at least one of the one or more streams currently stored in the local stream store;
    if the portion of the flow has been previously transmitted to the remote proxy, transmitting a first message to the remote proxy to indicate that the portion of the flow has been transmitted in at least one of the one or more streams previously transmitted to the remote proxy, wherein the first message includes a first stream ID identifying a first stream from the one or more streams previously transmitted to the remote proxy that is associated with the portion, an offset of the first stream from which the portion of the flow is located, and a length identifying a size of the portion of the flow, wherein the first message is transmitted to the remote proxy without a data content of the portion of the flow.

2. The method of claim 1, further comprising:
    if the portion of the flow has not been previously transmitted to the remote proxy, transmitting a second message to the remote proxy representing a second stream identified by a second stream ID as a new stream, the second message containing the data content of the portion of the flow; and
    storing the second stream identified by the second stream ID in the local stream store, the second stream containing the data content of the portion of the flow.

3. The method of claim 2, wherein comparing the flow of data comprises:
    chunking, using a predetermined chunking algorithm, the flow of data into a plurality of chunks representing the flow of data in a continuous order; and
    for each of the plurality of chunks, determining whether the chunk has been previously transmitted to the remote proxy via a previously transmitted stream;
    recording the chunk as part of the first stream if the chunk has been previously transmitted to the remote proxy; and
    otherwise recording the chunk as part of the second stream.

4. The method of claim 3, wherein determining whether the chunk has been previously transmitted to the remote proxy comprises:
    hashing, using a predetermined hash function, content associated with the chunk to generate a fingerprint; and performing a lookup in a chunk index based on the fingerprint to locate a chunk index entry that matches the fingerprint of the chunk, wherein the chunk is recorded as part of the first stream if a matched chunk index entry is found and wherein otherwise the chunk is recorded as part of the second stream.

5. The method of claim 4, wherein the chunk index comprises a plurality of chunk index entries, wherein each chunk index entry comprises:
   a chunk ID represented by a respective fingerprint of a corresponding chunk;
   a stream ID identifying a stream currently stored in the local stream store that contains the corresponding chunk; and
   a stream offset identifying a location of the corresponding chunk within the stream that is identified by the stream ID of the chunk index entry.

6. The method of claim 4, wherein recording the chunk as part of the first stream if the matched chunk index entry is found comprises:
   retrieving, from the local stream store, data based on information provided by the matched chunk index;
   performing a byte-to-byte comparison between the retrieved data and the chunk to determine whether the chunk is duplicated data in a previously transmitted stream;
   marking the chunk as part of the first stream only if all bytes between the chunk and the retrieved data are matched; and
   otherwise marking the chunk as part of the second stream.

7. The method of claim 3, further comprising:
   entering a duplicate data state if a first chunk of the chunks in sequence is a duplicated chunk that has been previously transmitted to the remote proxy;
   during the duplicate data state, marking the first chunk as part of the first stream;
   iteratively marking one or more subsequent bytes in the sequence as part of the first stream if the first subsequent chunks are duplicated bytes, without sending the first message to the remote proxy, until a byte in the sequence is found that has not been previously transmitted to the remote proxy;
   transmitting the first message to the remote proxy identifying the first stream and a location in which the first chunk and the first subsequent bytes leading up to the non-matching byte are located.

8. The method of claim 7, further comprising:
   entering a new data state once a non-matching byte has been identified;
   during the new data state, iteratively marking one or more second subsequent chunks that continuously follow as new chunks in the second stream if the second subsequent chunks are new, until a third chunk in the sequence is found that is a duplicated chunk, upon which the second message containing the second chunk and the second subsequent chunks is sent to the remote proxy; and
   entering the duplicate data state once the third chunk is found.

9. The method of claim 2, further comprising:
   generating the second stream ID, wherein the second stream ID is unique amongst a plurality of stream IDs identifying a plurality of streams that have been sent to the remote proxy; and
   prior to transmitting the second message, transmitting a third message containing the second stream ID to the remote proxy, wherein the third message indicates that subsequent data to be sent to the remote proxy within a same network connection session is associated with the second stream identified by the second stream ID.

10. A non-transitory machine-readable medium having instructions stored therein, which when executed by a processor, cause the processor to perform operations comprising:
    caching, in a local device, one or more streams of data transmitted over a wide area network to a remote device, wherein each of the one or more streams of data is stored in a continuous manner and identified by a unique stream identifier (ID);
    examining the flow of data to determine whether at least a portion of a flow received from a device has been previously transmitted to the remote device, based on the one or more streams cached in the local device; and
    if the portion of the flow has been previously transmitted to the remote device, transmitting a first message to the remote device without sending a content of the portion of the flow to indicate that the portion of the flow has been transmitted to the remote device, wherein the first message includes a first stream ID identifying a first stream that is a previously transmitted stream containing data of the portion of the flow, an offset of the first stream from which the portion of the flow is located, and a length identifying a size of the portion of the flow.

11. The medium of claim 10, storing additional instructions which, when executed by the processor, cause the processor to perform operations further comprising:
    if the portion of the flow has not been previously transmitted to the remote device, transmitting a second message to the remote device representing a second stream identified by a second stream ID as a new stream, the second message containing the content of the portion of the flow; and
    storing the second stream identified by the second stream ID in the local device, the second stream containing the content of the portion of the flow.

12. The medium of claim 11, wherein examining the flow of data to determine whether at least a portion of the flow has been transmitted previously to the remote device comprises:
    chunking, using a predetermined chunking algorithm, the flow of data into a plurality of chunks representing the flow of data in a continuous order; and
    for each of the plurality of chunks, determining whether a respective chunk has been previously transmitted to the remote device via a previously transmitted stream;
    recording the chunk as part of the first stream if the chunk has been previously transmitted to the remote device; and
    otherwise recording the chunk as part of the second stream.

13. The medium of claim 12, wherein determining whether the respective chunk has been previously transmitted to the remote device comprises:
    hashing using a predetermined hash function content of the chunk to generate a fingerprint; and
    performing a lookup in a chunk index based on the fingerprint to locate a chunk index entry that matches the fingerprint of the chunk, wherein the chunk is recorded as part of the first stream if a matched chunk index entry is found and wherein otherwise the chunk is recorded as part of the second stream.

14. The medium of claim 13, wherein the chunk index comprises a plurality of chunk index entries, wherein each chunk index entry comprises:

a chunk ID represented by a respective fingerprint of a corresponding chunk;

a stream ID identifying a stream currently stored in the local device that contains the corresponding chunk; and a stream offset identifying a location of the corresponding chunk within the stream that is identified by the stream ID of the chunk index entry.

15. The medium of claim 13, wherein recording the chunk as part of the first stream if a matched chunk index entry is found comprises:

retrieving from the local device data based on information provided by the matched chunk index;

performing a byte-to-byte comparison between the retrieved data and the chunk to determine whether the chunk is duplicated data in a previously transmitted stream;

marking the chunk as part of the first stream only if all bytes between the chunk and the retrieved data are matched; and otherwise marking the chunk as part of the second stream.

16. The medium of claim 12, storing additional instructions which, when executed by the processor, cause the processor to perform operations further comprising:

entering a duplicate data state if a first chunk of the chunks in sequence is a duplicated chunk that has been previously transmitted to the remote device;

during the duplicate data state, marking the first chunk as part of the first stream;

iteratively marking one or more subsequent bytes in the sequence as part of the first stream if first subsequent chunks are duplicated bytes, without sending the first message to the remote device, until a byte in the sequence is found that has not been previously transmitted to the remote device;

transmitting the first message to the remote device identifying the first stream and a location in which the first chunk and the first subsequent bytes leading up to the non-matching byte are located.

17. The medium of claim 16, storing additional instructions which, when executed by the processor, cause the processor to perform operations further comprising:

entering a new data state once a non-matching byte has been identified;

during the new data state, iteratively marking one or more second subsequent chunks that continuously follow as new chunks in the second stream if the second subsequent chunks are new, until a third chunk in the sequence is found that is a duplicated chunk, upon which the second message containing the second subsequent chunks is sent to the remote device; and entering the duplicate data state once the third chunk is found.

18. The medium of claim 11, storing additional instructions which, when executed by the processor, cause the processor to perform operations further comprising:

generating the second stream ID that is unique amongst a plurality of stream IDs identifying a plurality of streams that have been sent to the remote device; and prior to transmitting the second message, transmitting a third message containing the second stream ID to the remote device, wherein the third message indicates that subsequent data to be sent to the remote device within a same network connection session is associated with the second stream identified by the second stream ID.

19. A system, comprising:

a processor; and a memory coupled to the processor storing instructions, which when executed by the processor, cause the processor to perform operations comprising:

caching, in the system, one or more streams of data transmitted over a network to a remote device, wherein each stream is stored in a continuous manner and identified by a unique stream identifier (ID);

in response to a flow of data received by the system, determining whether at least a portion of the flow has been previously transmitted to the remote device based on the one or more streams; and if the portion of the flow has been previously transmitted to the remote device, transmitting a first message to the remote device without sending a content of the portion of the flow to indicate that the portion of the flow has been transmitted to the remote device, wherein the first message includes a first stream ID identifying a first stream that is a previously transmitted stream containing data of the portion of the flow, an offset of the first stream from which the portion of the flow is located, and a length identifying a size of the portion of the flow.

20. The system of claim 19, wherein the memory stores additional instructions which, when executed by the processor, cause the processor to perform operations comprising:

if the portion of the flow has not been previously transmitted to the remote device, transmitting a second message to the remote device representing a second stream identified by a second stream ID as a new stream, the second message containing the content of the portion of the flow; and storing the second stream identified by the second stream ID in the system, the second stream containing the content of the portion of the flow.

21. The system of claim 20, wherein determining that at least the portion of the flow has been transmitted previously to the remote device comprises:

chunking using a predetermined chunking algorithm the flow of data into a plurality of chunks representing the flow of data in a continuous order; and for each of the plurality of chunks, determining whether a respective chunk has been previously transmitted to the remote device via a previously transmitted stream;

recording the respective chunk as part of the first stream if the respective chunk has been previously transmitted to the remote device; and otherwise recording the respective chunk as part of the second stream.

22. The system of claim 21, wherein determining whether the respective chunk has been previously transmitted to the remote device comprises:

hashing using a predetermined hash function content of the respective chunk to generate a fingerprint; and performing a lookup in a chunk index based on the fingerprint to locate a chunk index entry that matches the fingerprint of the respective chunk, wherein the respective chunk is recorded as part of the first stream if a matched chunk index entry is found and wherein otherwise the respective chunk is recorded as part of the second stream.

23. The system of claim 22, wherein the chunk index comprises a plurality of chunk index entries, wherein each chunk index entry comprises:

a chunk ID represented by a fingerprint of a corresponding chunk;

a stream ID identifying a stream currently stored in the system that contains the corresponding chunk; and a stream offset identifying a location of the corresponding chunk within the stream that is identified by the stream ID of the chunk index entry.

24. The system of claim 22, wherein recording the chunk as part of the first stream if a matched chunk index entry is found comprises:

retrieving, from the system, data based on information provided by the matched chunk index;

performing a byte-to-byte comparison between the retrieved data and the respective chunk to determine whether the respective chunk is duplicated data in a previously transmitted stream;

marking the respective chunk as part of the first stream if all bytes between the respective chunk and the retrieved data are matched; and otherwise marking the chunk as part of the second stream.

25. The system of claim 21, wherein the memory stores additional instructions which, when executed by the processor, cause the processor to perform operations comprising:

entering a duplicate data state if a first chunk of the plurality of chunks in sequence is a duplicated chunk that has been previously transmitted to the remote device;

during the duplicate data state, marking the first chunk as part of the first stream;

iteratively marking one or more subsequent bytes in the sequence as part of the first stream if first subsequent chunks are duplicated bytes, without sending the first message to the remote device, until a byte in the sequence is found that has not been previously transmitted to the remote device;

transmitting the first message to the remote device identifying the first stream and a location in which the first chunk and the first subsequent bytes leading up to the non-matching byte are located.

26. The system of claim 25, wherein the memory stores additional instructions which, when executed by the processor, cause the processor to perform operations comprising:

entering a new data state once a non-matching byte has been identified;

during the new data state, iteratively marking one or more second subsequent chunks that continuously follow as new chunks in the second stream if the second subsequent chunks are new, until a third chunk in the sequence is found that is a duplicated chunk, upon which the second message containing the second subsequent chunks is sent to the remote device; and entering the duplicate data state once the third chunk is found.

27. The system of claim 20, wherein the memory stores additional instructions which, when executed by the processor, cause the processor to perform operations comprising:

generate the second stream ID that is unique amongst a plurality of stream IDs identifying a plurality of streams that have been sent to the remote device; and prior to transmitting the second message, transmit a third message containing the second stream ID to the remote device, wherein the third message indicates that subsequent data to be sent to the remote device within a same network connection session is associated with the second stream identified by the second stream ID.

* * * * *